United States Patent
Hsieh et al.

(10) Patent No.: US 8,699,150 B1
(45) Date of Patent: Apr. 15, 2014

(54) WIDE-ANGLE IMAGE CAPTURING LENS ASSEMBLY

(71) Applicant: Largan Precision Co., Ltd., Taichung (TW)

(72) Inventors: Dung-Yi Hsieh, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/726,213

(22) Filed: Dec. 23, 2012

(30) Foreign Application Priority Data

Dec. 10, 2012 (TW) ............................... 101146406 A

(51) Int. Cl.
*G02B 13/18* (2006.01)
*G02B 9/60* (2006.01)

(52) U.S. Cl.
USPC .......................................... 359/714; 359/770

(58) Field of Classification Search
CPC ....... G02B 13/0045; G02B 13/18; G02B 9/60
USPC .................................. 359/714, 770
See application file for complete search history.

(56) References Cited

U.S. PATENT DOCUMENTS

| | | | | |
|---|---|---|---|---|
| 7,298,561 B1* | 11/2007 | Yamashita et al. | ............ | 359/717 |
| 8,248,713 B2* | 8/2012 | Hsieh et al. | ............ | 359/753 |
| 8,508,861 B2* | 8/2013 | Tsai et al. | ............ | 359/714 |
| 8,570,670 B2* | 10/2013 | Kubota et al. | ............ | 359/753 |
| 8,576,497 B2* | 11/2013 | Hsu et al. | ............ | 359/714 |

\* cited by examiner

*Primary Examiner* — David N Spector
(74) *Attorney, Agent, or Firm* — CKC & Partners Co., Ltd.

(57) ABSTRACT

A wide-angle image capturing lens assembly includes, in order from an object side to an image side, a first lens element, a second lens element, a third lens element, a fourth lens element and a fifth lens element and each of the first through fifth lens elements is single and non-cemented. The first lens element with negative refractive power has a concave image-side surface. The second lens element with refractive power has a concave object-side surface and a convex image-side surface. The third lens element has positive refractive power. The fourth lens element has negative refractive power, wherein at least one of an object-side surface and an image-side surface of the fourth lens element is aspheric. The fifth lens element with positive refractive power has a convex image-side surface, wherein at least one of an object-side surface and the image-side surface of the fifth lens element is aspheric.

23 Claims, 17 Drawing Sheets

WIDE-ANGLE IMAGE CAPTURING LENS ASSEMBLY

RELATED APPLICATIONS

The application claims priority to Taiwan Application Serial Number 101146406, filed on Dec. 10, 2012, which is herein incorporated by reference.

BACKGROUND

1. Technical Field

The present invention relates to a wide-angle image capturing lens assembly. More particularly, the present invention relates to a compact wide-angle image capturing lens assembly applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure such as the one disclosed in U.S. Pat. No. 8,179,470. Due to the popularity of mobile products with high-end specifications, such as smartphones, PDAs (Personal Digital Assistants) and Tablet PC, the requirements for high resolution and better image quality of modern compact optical lens systems has been increasing significantly. However, the conventional four-element lens structure cannot satisfy these requirements of the compact optical lens system.

Although other conventional optical lens systems with five-element lens structure such as the one disclosed in U.S. Pat. No. 8,000,031. Although better image quality and larger field of view are obtained, the total track length of the optical lens system is thereby too long which might result in a larger size optical system. Moreover, it is thereby not favorable for keeping the optical lens system compact while maintaining a large field of view. It is also not favorable for assembling the lens elements by having an excessive air distance between lens elements since the structure of the optical lens system might thereby be loose.

SUMMARY

According to one aspect of the present disclosure, a wide-angle image capturing lens assembly includes, in order from an object side to an image side, a first lens element, a second lens element, a third lens element, a fourth lens element and a fifth lens element and each of the first through fifth lens elements is a single and non-cemented lens element. The first lens element with negative refractive power has a concave image-side surface. The second lens element with refractive power has a concave object-side surface and a convex image-side surface. The third lens element has positive refractive power. The fourth lens element has negative refractive power, wherein at least one of an object-side surface and an image-side surface of the fourth lens element is aspheric. The fifth lens element with positive refractive power has a convex image-side surface, wherein at least one of an object-side surface and the image-side surface of the fifth lens element is aspheric. When an axial distance between the image-side surface of the first lens element and the object-side surface of the second lens element is Dr2r3, a central thickness of the first lens element is CT1, a sum of a central thickness from the first through fifth lens elements is ΣCT, an axial distance between the object-side surface of the first lens element and the image-side surface of the fifth lens element is Td, a focal length of the wide-angle image capturing lens assembly is f, a focal length of the second lens element is f2, an axial distance between the object-side surface of the first lens element and the image-side surface of the second lens element is Dr1r4, and an axial distance between an object-side surface of the third lens element and the image-side surface of the fifth lens element is Dr5r10, the following relationships are satisfied:

$$1.0 < Dr2r3/CT1 < 2.5;$$

$$0.60 < \Sigma CT/Td < 0.81;$$

$$0 < |f/f2| < 0.30; \text{ and}$$

$$0.50 < Dr1r4/Dr5r10 < 1.09.$$

According to another aspect of the present disclosure, a wide-angle image capturing lens assembly includes, in order from an object side to an image side, a first lens element, a second lens element, a third lens element, a fourth lens element and a fifth lens element. The first lens element with negative refractive power has a concave image-side surface. The second lens element with refractive power has a concave object-side surface and a convex image-side surface. The third lens element has positive refractive power. The fourth lens element with negative refractive power has a concave image-side surface, wherein the image-side surface of the fourth lens element changes from concave at a paraxial region to convex at a peripheral region, and at least one of an object-side surface and the image-side surface of the fourth lens element is aspheric. The fifth lens element with positive refractive power has a convex image-side surface, wherein at least one of an object-side surface and the image-side surface of the fifth lens element is aspheric. When an axial distance between the image-side surface of the first lens element and the object-side surface of the second lens element is Dr2r3, a central thickness of the first lens element is CT1, a sum of a central thickness from the first through fifth lens elements is ΣCT, an axial distance between the object-side surface of the first lens element and the image-side surface of the fifth lens element is Td, a focal length of the wide-angle image capturing lens assembly is f, a focal length of the second lens element is f2, the following relationships are satisfied:

$$1.0 < Dr2r3/CT1 < 2.5;$$

$$0.55 < \Sigma CT/Td < 0.85; \text{ and}$$

$$0 < |f/f2| < 0.30.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
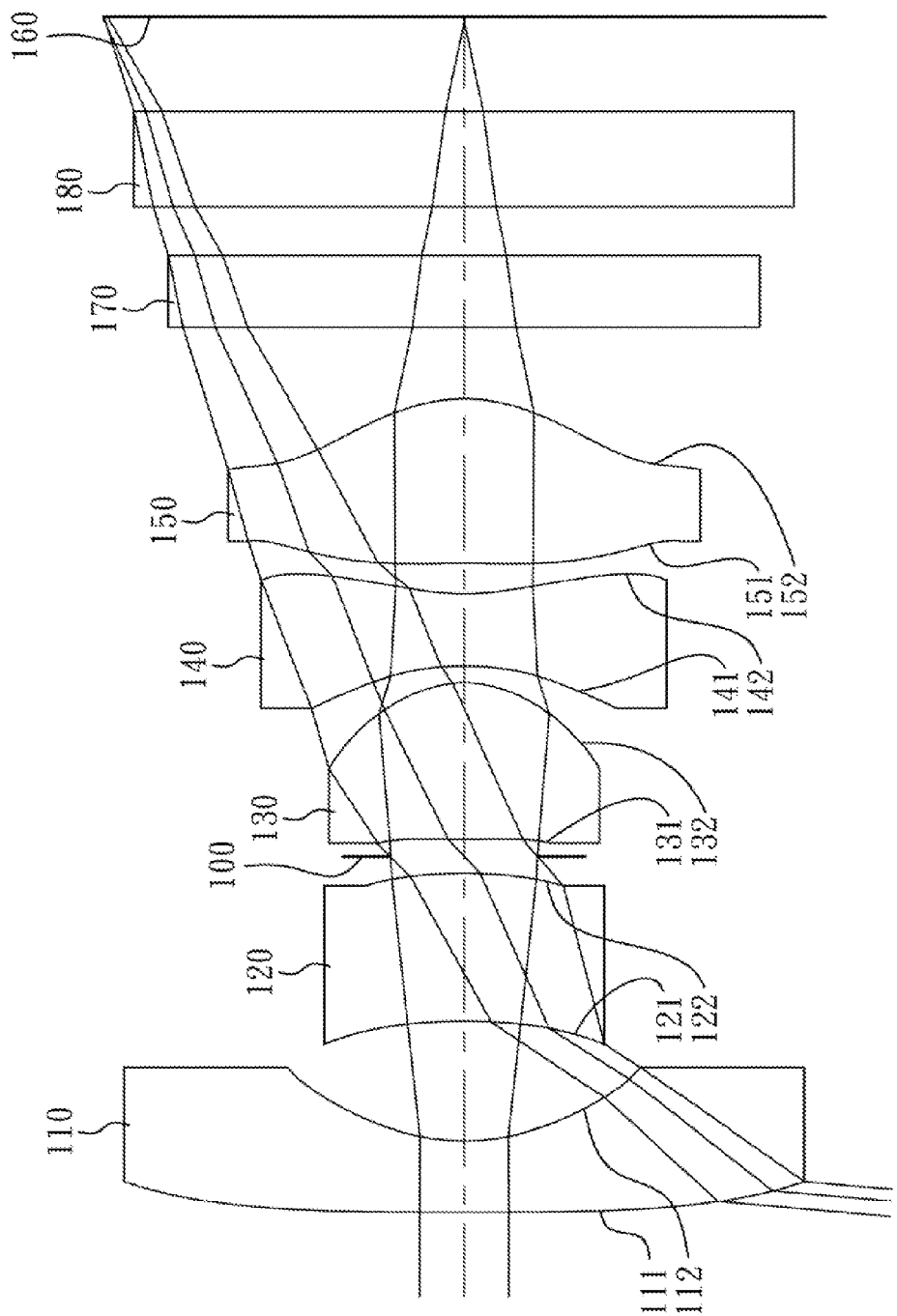
FIG. 1 is a schematic view of a wide-angle image capturing lens assembly according to the 1st embodiment of the present disclosure.

A wide-angle image capturing lens assembly includes, in order from an object side to an image side, a first lens element, a second lens element, a third lens element, a fourth lens element and a fifth lens element. Each of the first through fifth lens elements is a single and non-cemented lens element. That is, any two lens elements adjacent to each other are not cemented, and there is an air space between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the wide-angle image capturing lens assembly. Therefore, the wide-angle image capturing lens assembly of the present disclosure provides five non-cemented lens elements for improving the problem generated by the cemented lens elements.

The first lens element with negative refractive power has a concave image-side surface, so that the field of view of the wide-angle image capturing lens assembly can be enlarged.

The second lens element with refractive power has a concave object-side surface and a convex image-side surface. Therefore, it is favorable for correcting the aberration and astigmatism and for reducing the sensitivity of the wide-angle image capturing lens assembly. The resolving power of the assembly is thereby improved for better image quality.

The third lens element with positive refractive power can have a convex object-side surface and a convex image-side surface. Therefore, it is favorable for providing the wide-angle image capturing lens assembly with required positive refractive power and for reducing the spherical aberration.

The fourth lens element with negative refractive power can have a concave object-side surface and a concave image-side surface, wherein the image-side surface of the fourth lens element changes from concave at a paraxial region to convex at a peripheral region. Therefore, it is favorable for reducing the sensitivity of the wide-angle image capturing lens assembly by balancing with the distribution of the negative refractive power. It is also favorable for reducing the angle at which the incident light projects onto an image sensor from an off-axis field to increase a responding efficiency of the image sensor so as to improve image quality and to correct the aberration of the off-axis field.

The fifth lens element with positive refractive power has a convex image-side surface, so that the refractive variance of the incident light will be relatively minimized by reducing the angle of the incident light from the off-axis. Therefore, it is favorable for reducing the high-order aberration. Moreover, the image-side surface of the fifth lens element is inclined toward the image side of the wide-angle image capturing lens assembly at an end of a peripheral region of the image-side surface of the fifth lens element which within a location of a maximum effective radius thereof. Therefore, it is favorable for correcting the aberration of the off-axis field so as to improve the image quality.

When an axial distance between the image-side surface of the first lens element and the object-side surface of the second lens element is Dr2r3, and a central thickness of the first lens element is CT1, the following relationship is satisfied: $1.0 < Dr2r3/CT1 < 2.5$. Therefore, it is favorable for assembling by adjusting an axial distance between lens elements and the thickness of lens elements so as to increase the manufacturing yield rate. Preferably, the following relationship is further satisfied: $1.5 < Dr2r3/CT1 < 2.35$.

When a sum of a central thickness from the first through fifth lens elements is $\Sigma CT$, and an axial distance between an object-side surface of the first lens element and the image-side surface of the fifth lens element is Td, the following relationship is satisfied: $0.55 < \Sigma CT/Td < 0.85$. Therefore, it provides favorable moldability and homogeneity for plastic lens elements during the injection molding process to achieve superior image quality. It is also favorable for reducing the total track length of the wide-angle image capturing lens assembly so as to keep a compact size in order to be applied to portable electronic products. Preferably, the following relationship is satisfied: $0.60 < \Sigma CT/Td < 0.81$. More preferably, the following relationship is further satisfied: $0.70 < \Sigma CT/Td < 0.80$.

When a focal length of the wide-angle image capturing lens assembly is f, and a focal length of the second lens element is f2, the following relationship is satisfied: 0<|f/f2|<0.30. Therefore, it is favorable for reducing the aberration and distortion and for reducing the sensitivity so as to maintain a compact size by compensating with the first lens element.

When an axial distance between the object-side surface of the first lens element and the image-side surface of the second lens element is Dr1r4, and an axial distance between the object-side surface of the third lens element and the image-side surface of the fifth lens element is Dr5r10, the following relationship is satisfied: 0.50<Dr1r4/Dr5r10<1.09. Therefore, it is favorable for solving the problems of excessive large axial distance between lens elements resulting in having difficulty in assembling and of loose structure resulting in bad yield rate. It is also favorable for reducing the total track length so as to be applied to compact devices.

When an axial distance between the object-side surface of the first lens element and the image plane is TL, the following relationship is satisfied: 3.5 mm<TL<9.5 mm. Therefore, it is favorable for the wide-angle image capturing lens assembly maintaining a proper total track length so as to keep a compact size. Preferably, the following relationship is further satisfied: 4.0 mm<TL<8.0 mm.

When a curvature radius of the image-side surface of the third lens element is R6, and a curvature radius of the object-side surface of the fourth lens element is R7, the following relationship is satisfied: |R6/R7|<0.90. Therefore, it is favorable for reducing the spherical aberration and for correcting the aberration so as to improve image quality.

When a maximal field of view of the wide-angle image capturing lens assembly is FOV, the following relationship is satisfied: 130 degrees<FOV<200 degrees. Therefore, the wide-angle image capturing lens assembly can have a larger field of view for increasing image capturing range.

When the focal length of the wide-angle image capturing lens assembly is f, and a focal length of the first lens element is f1, the following relationship is satisfied: −0.80<f/f1<−0.40. Therefore, it is favorable for enlarging the field of view while maintaining a compact size by adjusting the negative refractive power of the first lens element so as to be applied to portable electronic products.

When the curvature radius of the object-side surface of the fourth lens element is R7, and a curvature radius of the image-side surface of the fourth lens element is R8, the following relationship is satisfied: −0.8<(R7+R8)/(R7−R8)<0.4. Therefore, it is favorable for correcting the aberration.

When an axial distance between the image-side surface of the second lens element and the object-side surface of the third lens element is Dr4r5, and the axial distance between the image-side surface of the first lens element and the object-side surface of the second lens element is Dr2r3, the following relationship is satisfied: 0.15<Dr4r5/Dr2r3<0.75. Therefore, it is favorable for increasing the yield rate and for reducing the total track length by adjusting the axial distance between lens elements.

The wide-angle image capturing lens assembly can further comprise a stop, such as an aperture stop, which locates between the second lens element and the third lens element. Therefore, it is favorable for enlarging the field of view of the wide-angle image capturing lens assembly and thereby provides a wider field of view for the same.

When a curvature radius of an object-side surface of the fifth lens element is R9, and a curvature radius of the image-side surface of the fifth lens element is R10, the following relationship is satisfied: 0.50<(R9+R10)/(R9−R10)<2.60. Therefore, it is favorable for correcting the astigmatism and for reducing the spherical aberration by adjusting the surface curvature of the fifth lens element.

According to the wide-angle image capturing lens assembly of the present disclosure, the lens elements thereof can be made of glass or plastic material. When the lens elements are made of glass material, the distribution of the refractive power of the wide-angle image capturing lens assembly may be more flexible to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the wide-angle image capturing lens assembly can also be reduced.

According to the wide-angle image capturing lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region; and when the lens element has a concave surface, it indicates that the surface is concave at the paraxial region.

According to the wide-angle image capturing lens assembly of the present disclosure, the wide-angle image capturing lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the wide-angle image capturing lens assembly of the present disclosure, the wide-angle image capturing lens assembly is featured with good correcting ability and high image quality, and can be applied to 3D (three-dimensional) image capturing applications, in products such as digital cameras, mobile devices and tablets.

According to the above description of the present disclosure, the following 1st-8th specific embodiments are provided for further explanation.

1st Embodiment

Figure 2:
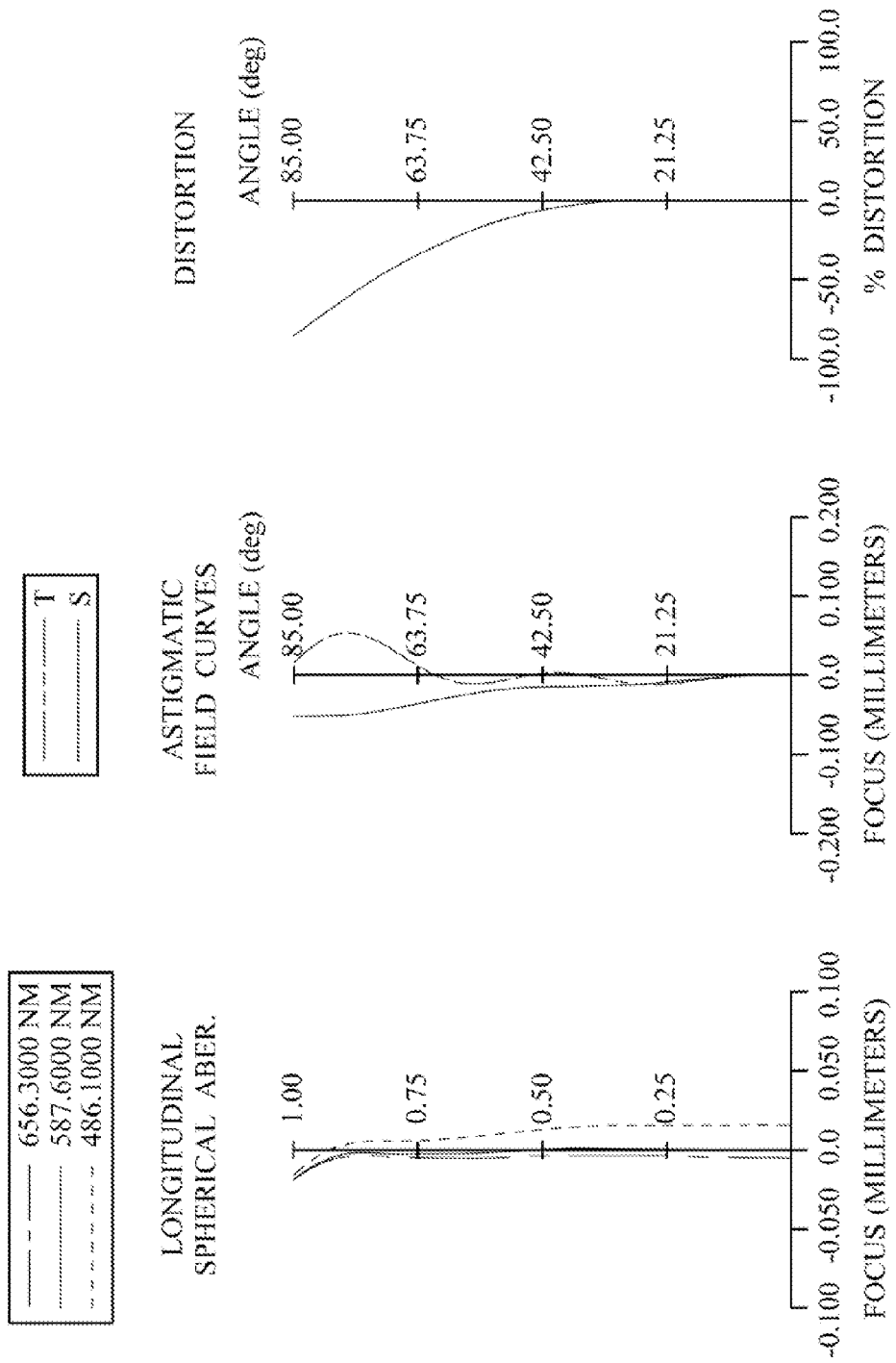
FIG. 2 shows spherical aberration curves, astigmatic field curves and a distortion curve of the wide-angle image capturing lens assembly according to the 1st embodiment.

FIG. 1 is a schematic view of a wide-angle image capturing lens assembly according to the 1st embodiment of the present disclosure. FIG. 2 shows spherical aberration curves, astigmatic field curves and a distortion curve of the wide-angle image capturing lens assembly according to the 1st embodiment. In FIG. 1, the wide-angle image capturing lens assembly includes, in order from an object side to an image side, a first lens element 110, a second lens element 120, an aperture stop 100, a third lens element 130, a fourth lens element 140, a fifth lens element 150, an IR-cut filter 170, a cover glass 180 and an image plane 160.

The first lens element 110 with negative refractive power has an object-side surface 111 being convex at a paraxial region thereof and an image-side surface 112 being concave at a paraxial region thereof. The first lens element 110 is made of plastic material and has the object-side surface 111 and the image-side surface 112 being both aspheric.

The second lens element 120 with positive refractive power has an object-side surface 121 being concave at a paraxial region thereof and an image-side surface 122 being convex at a paraxial region thereof. The second lens element 120 is made of plastic material and has the object-side surface 121 and the image-side surface 122 being both aspheric.

The third lens element 130 with positive refractive power has an object-side surface 131 being convex at a paraxial region thereof and an image-side surface 132 being convex at a paraxial region thereof. The third lens element 130 is made of plastic material and has the object-side surface 131 and the image-side surface 132 being both aspheric.

The fourth lens element 140 with negative refractive power has an object-side surface 141 being concave at a paraxial region thereof and an image-side surface 142 being concave at a paraxial region thereof, wherein the image-side surface 142 of the fourth lens element 140 changes from concave at the paraxial region thereof to convex at a peripheral region thereof. The fourth lens element 140 is made of plastic material and has the object-side surface 141 and the image-side surface 142 being both aspheric.

The fifth lens element 150 with positive refractive power has an object-side surface 151 being concave at a paraxial region thereof and an image-side surface 152 being convex at a paraxial region thereof. The fifth lens element 150 is made of plastic material and has the object-side surface 151 and the image-side surface 152 being both aspheric.

Each of the first through fifth lens elements (110-150) is a single and non-cemented lens element. The IR-cut filter 170 and the cover glass 180 are made of glass materials which are in order located between the fifth lens element 150 and the image plane 160, and will not affect the focal length of the wide-angle image capturing lens assembly.

The equation of the aspheric surface profiles of the aforementioned lens elements of the wide-angle image capturing lens assembly is expressed as follows:

$$X(Y) = (Y^2/R)/(1 + \text{sqrt}(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the wide-angle image capturing lens assembly according to the 1st embodiment, when a focal length of the wide-angle image capturing lens assembly is f, an f-number of the wide-angle image capturing lens assembly is Fno, and half of the maximal field of view of the wide-angle image capturing lens assembly is HFOV, these parameters have the following values:

f=0.91 mm;

Fno=2.45; and

HFOV=85.0 degrees.

In the wide-angle image capturing lens assembly according to the 1st embodiment, when an axial distance between the image-side surface 112 of the first lens element 110 and the object-side surface 121 of the second lens element 120 is Dr2r3, and a central thickness of the first lens element 110 is CT1, the following relationship is satisfied:

$Dr2r3/CT1=1.667.$

In the wide-angle image capturing lens assembly according to the 1st embodiment, when an axial distance between the image-side surface 122 of the second lens element 120 and the object-side surface 131 of the third lens element 130 is Dr4r5, and an axial distance between the image-side surface 112 of the first lens element 110 and the object-side surface 121 of the second lens element 120 is Dr2r3, the following relationship is satisfied:

$Dr4r5/Dr2r3=0.280.$

In the wide-angle image capturing lens assembly according to the 1st embodiment, when an axial distance between the object-side surface 111 of the first lens element 110 and the image-side surface 122 of the second lens element 120 is Dr1r4 and an axial distance between the object-side surface 131 of the third lens element 130 and the image-side surface 152 of the fifth lens element 150 is Dr5r10, the following relationship is satisfied:

$Dr1r4/Dr5r10=0.770.$

In the wide-angle image capturing lens assembly according to the 1st embodiment, when a sum of a central thickness from the first through fifth lens elements (110-150) is $\Sigma CT$ and an axial distance between the object-side surface 111 of the first lens element 110 and the image-side surface 152 of the fifth lens element 150 is Td, the following relationship is satisfied:

$\Sigma CT/Td=0.753.$

In the wide-angle image capturing lens assembly according to the 1st embodiment, when an axial distance between the object-side surface 111 of the first lens element 110 and the image plane 160 is TL, the following relationship is satisfied:

$TL=4.997$ mm.

In the wide-angle image capturing lens assembly according to the 1st embodiment, when a curvature radius of the image-side surface 132 of the third lens element 130 is R6, and a curvature radius of the object-side surface 141 of the fourth lens element 140 is R7, the following relationship is satisfied:

$|R6/R7|=0.34.$

In the wide-angle image capturing lens assembly according to the 1st embodiment, when the curvature radius of the object-side surface 141 of the fourth lens element 140 is R7, and a curvature radius of the image-side surface 142 of the fourth lens element 140 is R8, the following relationship is satisfied:

$(R7+R8)/(R7-R8)=0.17.$

In the wide-angle image capturing lens assembly according to the 1st embodiment, when a curvature radius of the object-side surface 151 of the fifth lens element 150 is R9 and a curvature radius of the image-side surface 152 of the fifth lens element 150 is R10, the following relationship is satisfied:

$(R9+R10)/(R9-R10)=1.19.$

In the wide-angle image capturing lens assembly according to the 1st embodiment, when a focal length of the wide-angle image capturing lens assembly is f, and a focal length of the first lens element 110 is f1, the following relationship is satisfied:

$$f/f1 = -0.536$$

In the wide-angle image capturing lens assembly according to the 1st embodiment, when the focal length of the wide-angle image capturing lens assembly is f, and a focal length of the second lens element 120 is f2, the following relationship is satisfied:

$$|f/f2| = 0.065.$$

In the wide-angle image capturing lens assembly according to the 1st embodiment, when a maximal field of view of the wide-angle image capturing lens assembly is FOV, the following relationship is satisfied:

$$FOV = 170.0 \text{ degrees}.$$

The detailed optical data of the 1st embodiment are shown in Table 1 and the aspheric surface data are shown in Table 2 below.

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
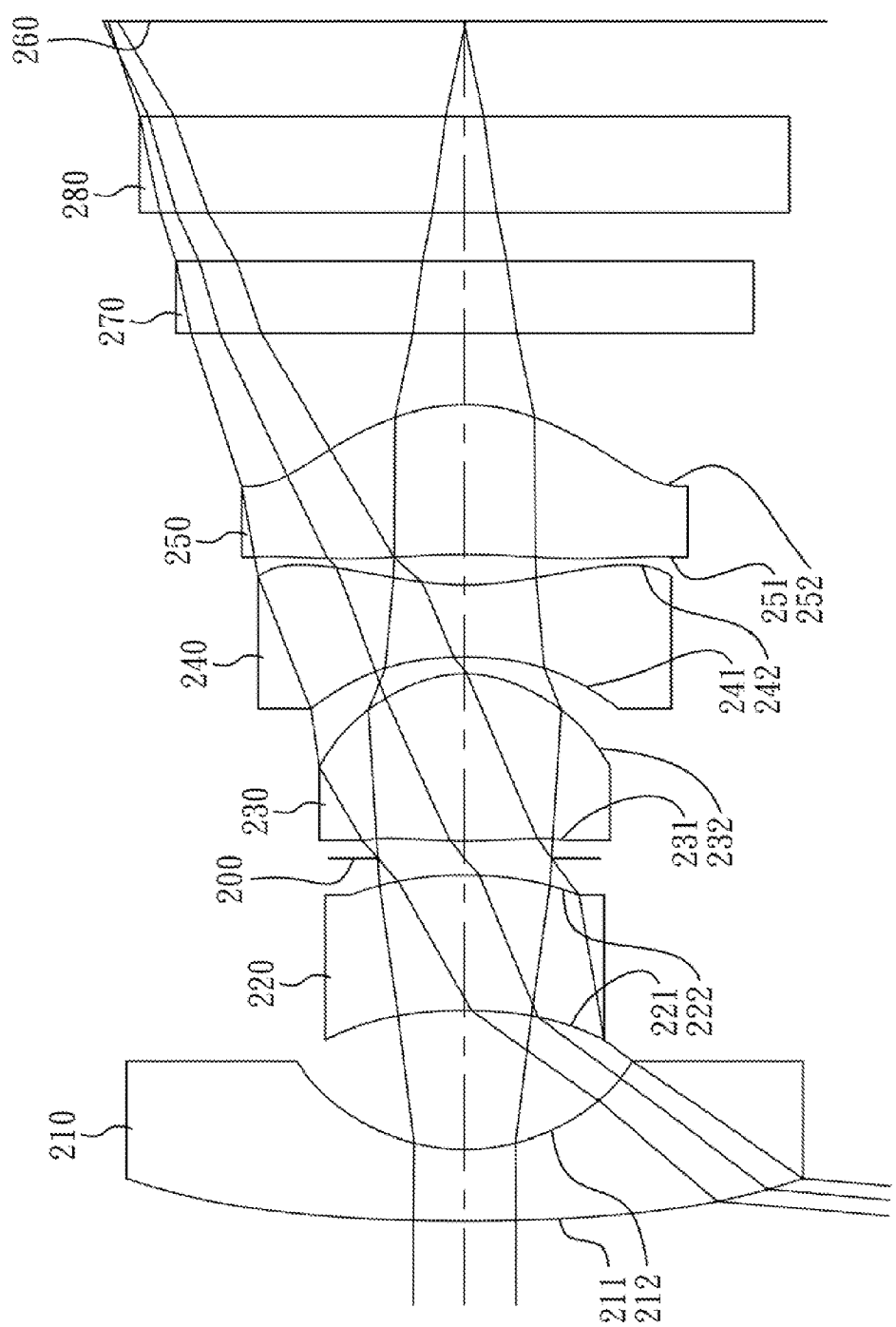
FIG. 3 is a schematic view of a wide-angle image capturing lens assembly according to the 2nd embodiment of the present disclosure.
Figure 4:
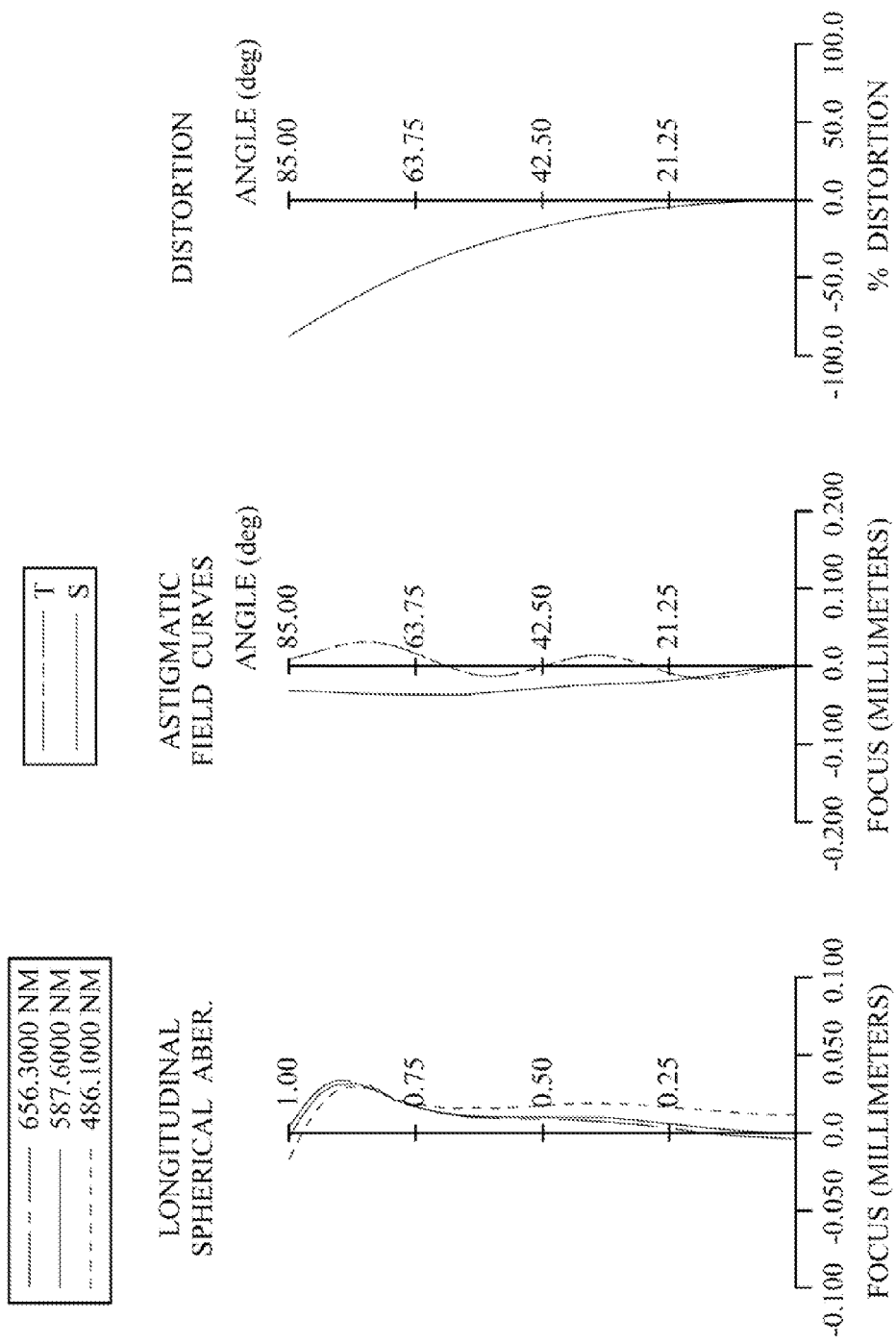
FIG. 4 shows spherical aberration curves, astigmatic field curves and a distortion curve of the wide-angle image capturing lens assembly according to the 2nd embodiment.

FIG. 3 is a schematic view of a wide-angle image capturing lens assembly according to the 2nd embodiment of the present disclosure. FIG. 4 shows spherical aberration curves, astigmatic field curves and a distortion curve of the wide-angle image capturing lens assembly according to the 2nd embodiment. In FIG. 3, the wide-angle image capturing lens assembly includes, in order from an object side to an image side, a first lens element 210, a second lens element 220, an aperture stop 200, a third lens element 230, a fourth lens element 240, a fifth lens element 250, an IR-cut filter 270, a cover glass 280 and an image plane 260.

TABLE 1

1st Embodiment
f = 0.91 mm, Fno = 2.45, HFOV = 85.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 40.403 | (ASP) | 0.300 | Plastic | 1.544 | 55.9 | −1.70 |
| 2 | | 0.900 | (ASP) | 0.500 | | | | |
| 3 | Lens 2 | −2.751 | (ASP) | 0.618 | Plastic | 1.640 | 23.3 | 14.02 |
| 4 | | −2.290 | (ASP) | 0.070 | | | | |
| 5 | Ape. Stop | Plano | | 0.070 | | | | |
| 6 | Lens 3 | 6.211 | (ASP) | 0.656 | Plastic | 1.544 | 55.9 | 0.82 |
| 7 | | −0.465 | (ASP) | 0.070 | | | | |
| 8 | Lens 4 | −1.375 | (ASP) | 0.300 | Plastic | 1.640 | 23.3 | −0.85 |
| 9 | | 0.972 | (ASP) | 0.129 | | | | |
| 10 | Lens 5 | −8.178 | (ASP) | 0.687 | Plastic | 1.535 | 55.7 | 1.40 |
| 11 | | −0.708 | (ASP) | 0.300 | | | | |
| 12 | IR-cut filter | Plano | | 0.300 | Glass | 1.517 | 64.2 | — |
| 13 | | Plano | | 0.200 | | | | |
| 14 | Cover glass | Plano | | 0.400 | Glass | 1.517 | 64.2 | — |
| 15 | | Plano | | 0.397 | | | | |
| 16 | Image | Plano | | — | | | | |

Note:
Reference wavelength (d-line) is 587.6 nm.

TABLE 2

Aspheric Coefficients

| Surface # | 1 | 2 | 3 | 4 | 6 |
|---|---|---|---|---|---|
| k = | 1.6652E+01 | 2.4499E−01 | 1.0597E+01 | 1.1141E+01 | −5.0000E+01 |
| A4 = | 2.4918E−02 | −3.7055E−01 | −3.5148E−01 | −5.9368E−01 | −1.5832E+00 |
| A6 = | 5.7328E−04 | 1.0690E−01 | 4.1663E−01 | 2.0302E+00 | 7.1682E+00 |
| A8 = | −5.9446E−06 | −3.1390E−01 | 7.4288E−01 | −2.8929E+00 | −9.3423E+01 |
| A10 = | | | −1.6657E+00 | 1.4270E−01 | 3.2903E+02 |
| A12 = | | | 6.1400E−32 | −2.1107E−04 | |

| Surface # | 7 | 8 | 9 | 10 | 11 |
|---|---|---|---|---|---|
| k = | −6.7771E−01 | −3.4737E+01 | −1.2057E+01 | −1.5904E+01 | −1.5687E+00 |
| A4 = | 8.0980E−01 | −2.9704E+00 | −5.4731E−01 | 7.7425E−01 | 9.1424E−02 |
| A6 = | −2.1104E−01 | 1.6208E+01 | 1.9178E+00 | −1.1389E+00 | −6.7397E−02 |
| A8 = | −3.6347E+00 | −5.1769E+01 | −4.6215E+00 | 6.7579E−01 | 1.7632E+00 |
| A10 = | 4.3906E−01 | 9.2727E+01 | 5.4493E+00 | 2.3617E−01 | −2.4032E+00 |
| A12 = | | −7.0292E+01 | −2.6513E+00 | −4.7929E−01 | 8.9055E−01 |

The first lens element 210 with negative refractive power has an object-side surface 211 being convex at a paraxial region thereof and an image-side surface 212 being concave at a paraxial region thereof. The first lens element 210 is made of plastic material and has the object-side surface 211 and the image-side surface 212 being both aspheric.

The second lens element 220 with positive refractive power has an object-side surface 221 being concave at a paraxial region thereof and an image-side surface 222 being convex at a paraxial region thereof. The second lens element 220 is made of plastic material and has the object-side surface 221 and the image-side surface 222 being both aspheric.

The third lens element 230 with positive refractive power has an object-side surface 231 being convex at a paraxial region thereof and an image-side surface 232 being convex at a paraxial region thereof. The third lens element 230 is made of plastic material and has the object-side surface 231 and the image-side surface 232 being both aspheric.

The fourth lens element 240 with negative refractive power has an object-side surface 241 being concave at a paraxial region thereof and an image-side surface 242 being concave at a paraxial region thereof, wherein the image-side surface 242 of the fourth lens element 240 changes from concave at the paraxial region thereof to convex at a peripheral region thereof. The fourth lens element 240 is made of plastic material and has the object-side surface 241 and the image-side surface 242 being both aspheric.

The fifth lens element 250 with positive refractive power has an object-side surface 251 being concave at a paraxial region thereof and an image-side surface 252 being convex at a paraxial region thereof. The fifth lens element 250 is made of plastic material and has the object-side surface 251 and the image-side surface 252 being both aspheric.

Each of the first through fifth lens elements (210-250) is a single and non-cemented lens element. The IR-cut filter 270 and the cover glass 280 are made of glass materials which are in order located between the fifth lens element 250 and the image plane 260, and will not affect the focal length of the wide-angle image capturing lens assembly.

The detailed optical data of the 2nd embodiment are shown in Table 3 and the aspheric surface data are shown in Table 4 below.

TABLE 3

2nd Embodiment
f = 1.06 mm, Fno = 2.47, HFOV = 85.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 9.134 | (ASP) | 0.300 | Plastic | 1.544 | 55.9 | −1.82 |
| 2 | | 0.885 | (ASP) | 0.576 | | | | |
| 3 | Lens 2 | −1.981 | (ASP) | 0.566 | Plastic | 1.640 | 23.3 | 12.13 |
| 4 | | −1.754 | (ASP) | 0.070 | | | | |
| 5 | Ape. Stop | Plano | | 0.070 | | | | |
| 6 | Lens 3 | 2.458 | (ASP) | 0.699 | Plastic | 1.544 | 55.9 | 0.85 |
| 7 | | −0.515 | (ASP) | 0.070 | | | | |
| 8 | Lens 4 | −1.448 | (ASP) | 0.300 | Plastic | 1.640 | 23.3 | −0.98 |
| 9 | | 1.188 | (ASP) | 0.127 | | | | |
| 10 | Lens 5 | −2.858 | (ASP) | 0.662 | Plastic | 1.535 | 56.3 | 1.94 |
| 11 | | −0.819 | (ASP) | 0.300 | | | | |
| 12 | IR-cut filter | Plano | | 0.300 | Glass | 1.517 | 64.2 | — |
| 13 | | Plano | | 0.200 | | | | |
| 14 | Cover glass | Plano | | 0.400 | Glass | 1.517 | 64.2 | — |
| 15 | | Plano | | 0.400 | | | | |
| 16 | Image | Plano | | — | | | | |

Note:
Reference wavelength (d-line) is 587.6 nm.

TABLE 4

Aspheric Coefficients

| Surface # | 1 | 2 | 3 | 4 | 6 |
|---|---|---|---|---|---|
| k = | 6.1887E+00 | 3.4889E−01 | 7.6445E+00 | 6.7834E+00 | −4.5484E+01 |
| A4 = | 1.9358E−02 | −1.3816E−02 | −2.6084E−01 | −4.8295E−01 | −8.3094E−01 |
| A6 = | −2.2616E−03 | −1.9984E−01 | 2.7976E−01 | 2.0776E+00 | 4.5877E+00 |
| A8 = | 4.6905E−04 | 2.7359E−02 | 9.2172E−01 | −1.3602E+00 | −4.5161E+01 |
| A10 = | | | −4.8875E−02 | −8.3650E−01 | 1.1095E+02 |
| A12 = | | | −3.2490E−31 | −2.1107E−04 | |

| Surface # | 7 | 8 | 9 | 10 | 11 |
|---|---|---|---|---|---|
| k = | −5.9594E−01 | −3.0502E+01 | −1.3311E+01 | −8.0210E+00 | −1.0350E+00 |
| A4 = | 7.5856E−01 | −2.0529E+00 | −2.4324E−01 | 4.1284E−01 | −5.3690E−02 |
| A6 = | −9.3498E−01 | 8.0154E+00 | 7.8866E−01 | 3.3256E−01 | 6.1298E−01 |
| A8 = | −4.7828E−01 | −2.6769E+01 | −2.4027E+00 | −2.7879E+00 | −1.4155E+00 |
| A10 = | −9.1853E−01 | 5.3249E+01 | 2.9923E+00 | 4.1567E+00 | 2.2643E+00 |
| A12 = | | −4.3576E+01 | −1.5937E+00 | −2.0906E+00 | −1.1416E+00 |

In the wide-angle image capturing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| | |
|---|---|
| f (mm) | 1.06 |
| Fno | 2.47 |
| HFOV (deg.) | 85.0 |
| Dr2r3/CT1 | 1.920 |
| Dr4r5/Dr2r3 | 0.243 |
| Dr1r4/Dr5r10 | 0.793 |
| ΣCT/Td | 0.731 |
| TL (mm) | 5.000 |
| |R6/R7| | 0.36 |
| (R7 + R8)/(R7 − R8) | 0.10 |
| (R9 + R10)/(R9 − R10) | 1.80 |
| f/f1 | −0.580 |
| |f/f2| | 0.087 |
| FOV (deg.) | 170.0 |

3rd Embodiment

Figure 5:
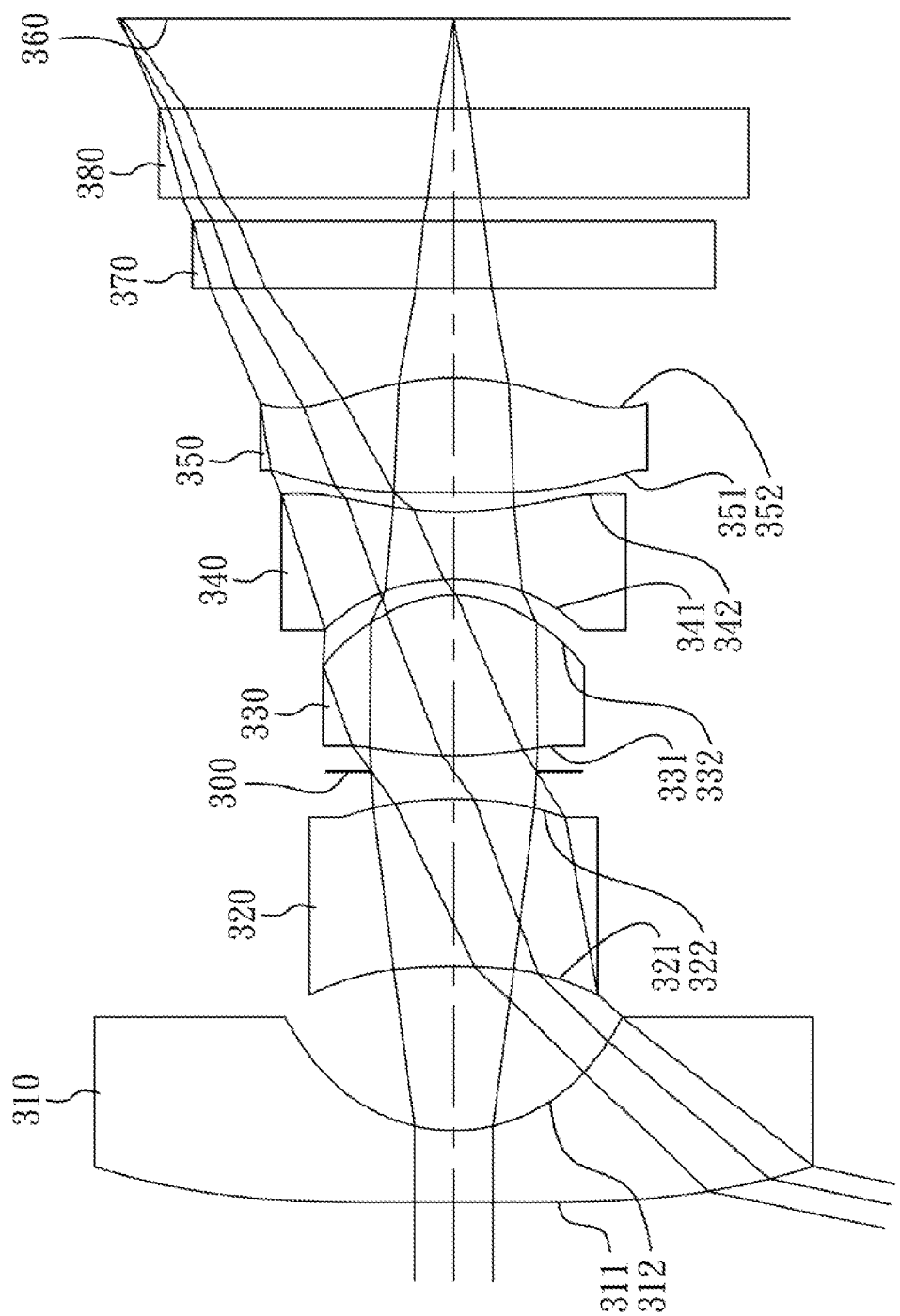
FIG. 5 is a schematic view of a wide-angle image capturing lens assembly according to the 3rd embodiment of the present disclosure.
Figure 6:
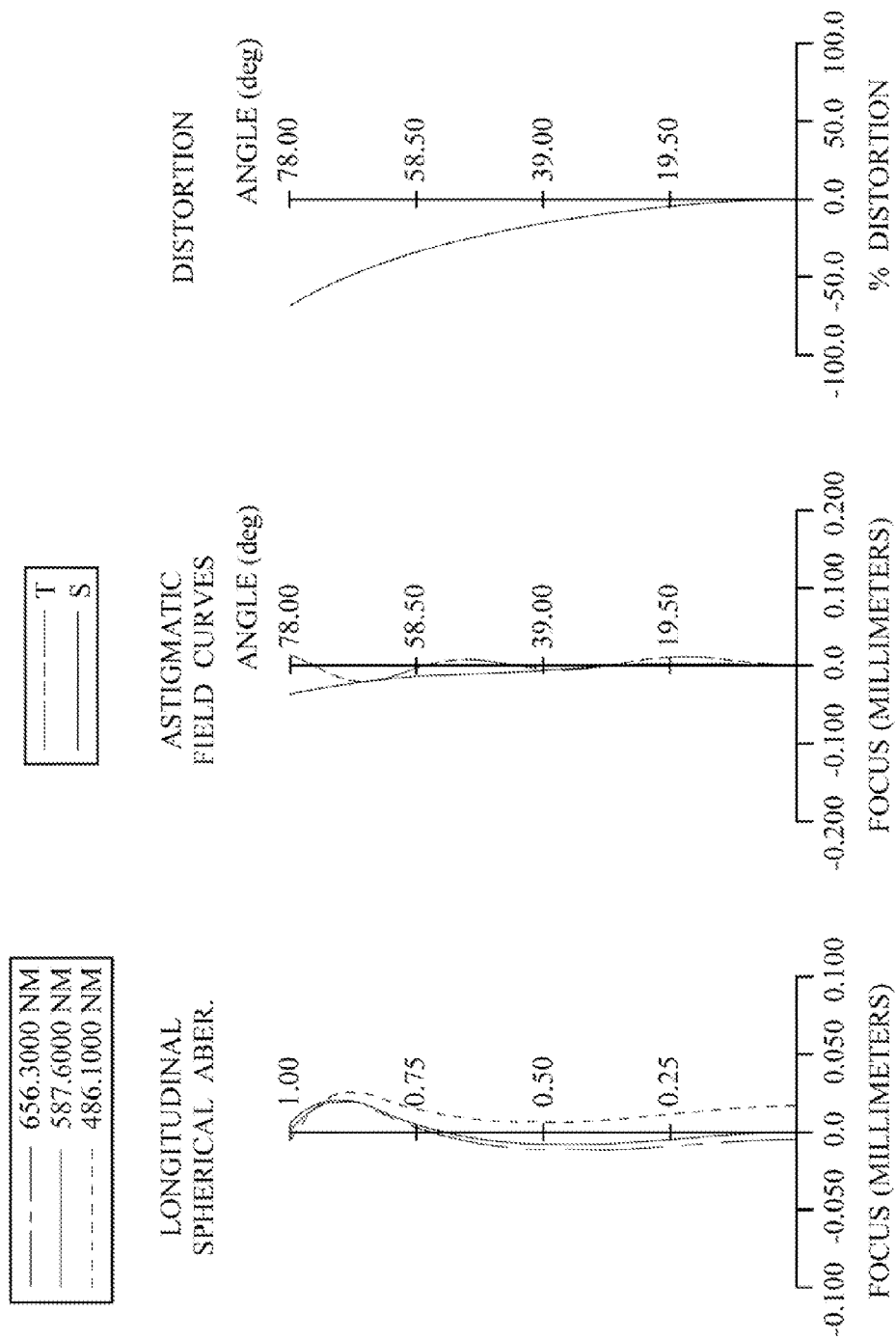
FIG. 6 shows spherical aberration curves, astigmatic field curves and a distortion curve of the wide-angle image capturing lens assembly according to the 3rd embodiment.

FIG. 5 is a schematic view of a wide-angle image capturing lens assembly according to the 3rd embodiment of the present disclosure. FIG. 6 shows spherical aberration curves, astigmatic field curves and a distortion curve of the wide-angle image capturing lens assembly according to the 3rd embodiment. In FIG. 5, the wide-angle image capturing lens assembly includes, in order from an object side to an image side, a first lens element 310, a second lens element 320, an aperture stop 300, a third lens element 330, a fourth lens element 340, a fifth lens element 350, an IR-cut filter 370, a cover glass 380 and an image plane 360.

The first lens element 310 with negative refractive power has an object-side surface 311 being concave at a paraxial region thereof and an image-side surface 312 being concave at a paraxial region thereof. The first lens element 310 is made of plastic material and has the object-side surface 311 and the image-side surface 312 being both aspheric.

The second lens element 320 with positive refractive power has an object-side surface 321 being concave at a paraxial region thereof and an image-side surface 322 being convex at a paraxial region thereof. The second lens element 320 is made of plastic material and has the object-side surface 321 and the image-side surface 322 being both aspheric.

The third lens element 330 with positive refractive power has an object-side surface 331 being convex at a paraxial region thereof and an image-side surface 332 being convex at a paraxial region thereof. The third lens element 330 is made of plastic material and has the object-side surface 331 and the image-side surface 332 being both aspheric.

The fourth lens element 340 with negative refractive power has an object-side surface 341 being concave at a paraxial region thereof and an image-side surface 342 being concave at a paraxial region thereof, wherein the image-side surface 342 of the fourth lens element 340 changes from concave at the paraxial region thereof to convex at a peripheral region thereof. The fourth lens element 340 is made of plastic material and has the object-side surface 341 and the image-side surface 342 being both aspheric.

Figure 17:
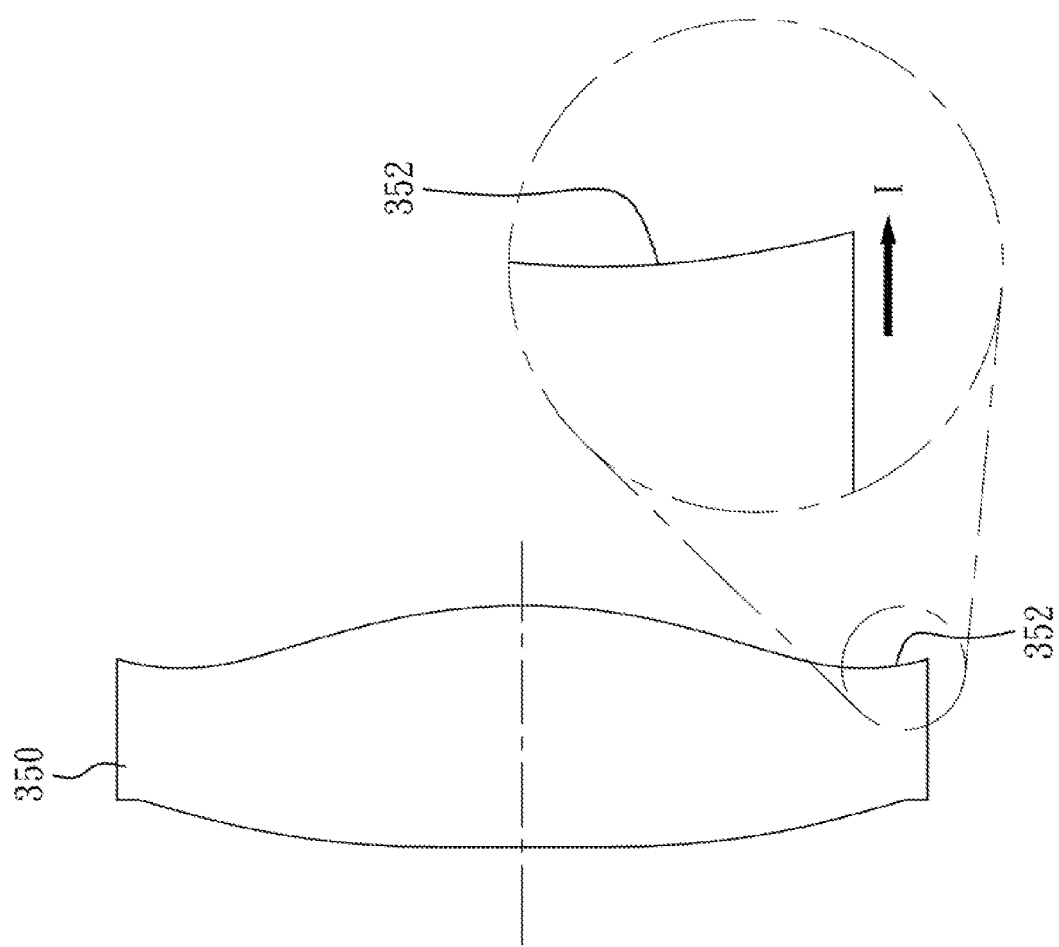
FIG. 17 shows an end of a peripheral region of the image-side surface of the fifth lens element within a location of a maximum effective radius thereof according to the 3rd embodiment.

The fifth lens element 350 with positive refractive power has an object-side surface 351 being concave at a paraxial region thereof and an image-side surface 352 being convex at a paraxial region thereof, wherein the image-side surface 352 of the fifth lens element 350 is inclined toward the image side I of the wide-angle image capturing lens assembly at an end of a peripheral region of the image-side surface 352 of the fifth lens element 350 which within a location of a maximum effective radius thereof (Please refer to FIG. 17). The fifth lens element 350 is made of plastic material and has the object-side surface 351 and the image-side surface 352 being both aspheric.

Each of the first through fifth lens elements (310-350) is a single and non-cemented lens element. The IR-cut filter 370 and the cover glass 380 are made of glass materials which are in order located between the fifth lens element 350 and the image plane 360, and will not affect the focal length of the wide-angle image capturing lens assembly.

The detailed optical data of the 3rd embodiment are shown in Table 5 and the aspheric surface data are shown in Table 6 below.

TABLE 5

3rd Embodiment
f = 1.00 mm, Fno = 2.87, HFOV = 78.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −55.329 | (ASP) | 0.318 | Plastic | 1.544 | 55.9 | −1.39 |
| 2 | | 0.768 | (ASP) | 0.731 | | | | |
| 3 | Lens 2 | −3.311 | (ASP) | 0.745 | Plastic | 1.583 | 30.2 | 6.21 |
| 4 | | −1.873 | (ASP) | 0.124 | | | | |
| 5 | Ape. Stop | Plano | | 0.070 | | | | |
| 6 | Lens 3 | 1.518 | (ASP) | 0.712 | Plastic | 1.544 | 55.9 | 0.85 |
| 7 | | −0.558 | (ASP) | 0.070 | | | | |
| 8 | Lens 4 | −1.051 | (ASP) | 0.301 | Plastic | 1.633 | 23.4 | −0.86 |
| 9 | | 1.264 | (ASP) | 0.085 | | | | |
| 10 | Lens 5 | −139.713 | (ASP) | 0.513 | Plastic | 1.535 | 55.7 | 2.29 |
| 11 | | −1.215 | (ASP) | 0.400 | | | | |
| 12 | IR-cut filter | Plano | | 0.300 | Glass | 1.517 | 64.2 | — |
| 13 | | Plano | | 0.100 | | | | |
| 14 | Cover glass | Plano | | 0.400 | Glass | 1.517 | 64.2 | — |
| 15 | | Plano | | 0.400 | | | | |
| 16 | Image | Plano | | — | | | | |

Note:
Reference wavelength (d-line) is 587.6 nm.

TABLE 6

| Aspheric Coefficients | | | | | |
|---|---|---|---|---|---|
| Surface # | 1 | 2 | 3 | 4 | 6 |
| k = | 9.0000E+01 | −1.1503E+00 | 2.0827E+01 | 9.5049E+00 | 5.0773E+00 |
| A4 = | 5.2041E−02 | 4.6387E−01 | −3.6113E−01 | −4.6359E−01 | −9.1555E−01 |
| A6 = | −1.3507E−02 | −7.3145E−01 | −2.7487E−01 | 2.7693E+00 | 2.1606E+00 |
| A8 = | 1.6377E−03 | 2.3683E+00 | 1.3347E+00 | −5.2114E+00 | −1.5715E+01 |
| A10 = | | −1.8325E+00 | 1.6144E−01 | 1.1483E+01 | 2.8383E+01 |
| A12 = | | | | −2.1107E−04 | |

| Surface # | 7 | 8 | 9 | 10 | 11 |
|---|---|---|---|---|---|
| k = | −6.7511E−01 | −1.9792E+01 | −3.3820E+00 | 9.0000E+01 | −1.4428E+00 |
| A4 = | 2.3980E−01 | −3.1434E+00 | −6.5337E−01 | 6.4206E−01 | 8.2739E−02 |
| A6 = | 1.9778E+00 | 1.5063E+01 | 1.7530E+00 | −1.0803E+00 | −3.4153E−02 |
| A8 = | −9.2647E+00 | −5.0635E+01 | −4.2521E+00 | 7.5744E+00 | 1.7669E+00 |
| A10 = | 8.8100E+00 | 9.1058E+01 | 5.2503E+00 | 2.3369E−01 | −2.3999E+00 |
| A12 = | 1.4981E−10 | −7.0292E+01 | −2.6513E+00 | −4.6695E−01 | 8.9055E−01 |
| A14 = | −3.0011E−10 | | | 6.0232E−02 | |
| A16 = | 2.3429E−10 | | | −1.0620E−01 | |

In the wide-angle image capturing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| | |
|---|---|
| f (mm) | 1.00 |
| Fno | 2.87 |
| HFOV (deg.) | 78.0 |
| Dr2r3/CT1 | 2.299 |
| Dr4r5/Dr2r3 | 0.265 |
| Dr1r4/Dr5r10 | 1.067 |
| ΣCT/Td | 0.706 |
| TL (mm) | 5.269 |
| |R6/R7| | 0.53 |
| (R7 + R8)/(R7 − R8) | −0.09 |
| (R9 + R10)/(R9 − R10) | 1.02 |
| f/f1 | −0.720 |
| |f/f2| | 0.161 |
| HFOV (deg.) | 156.0 |

4th Embodiment

Figure 7:
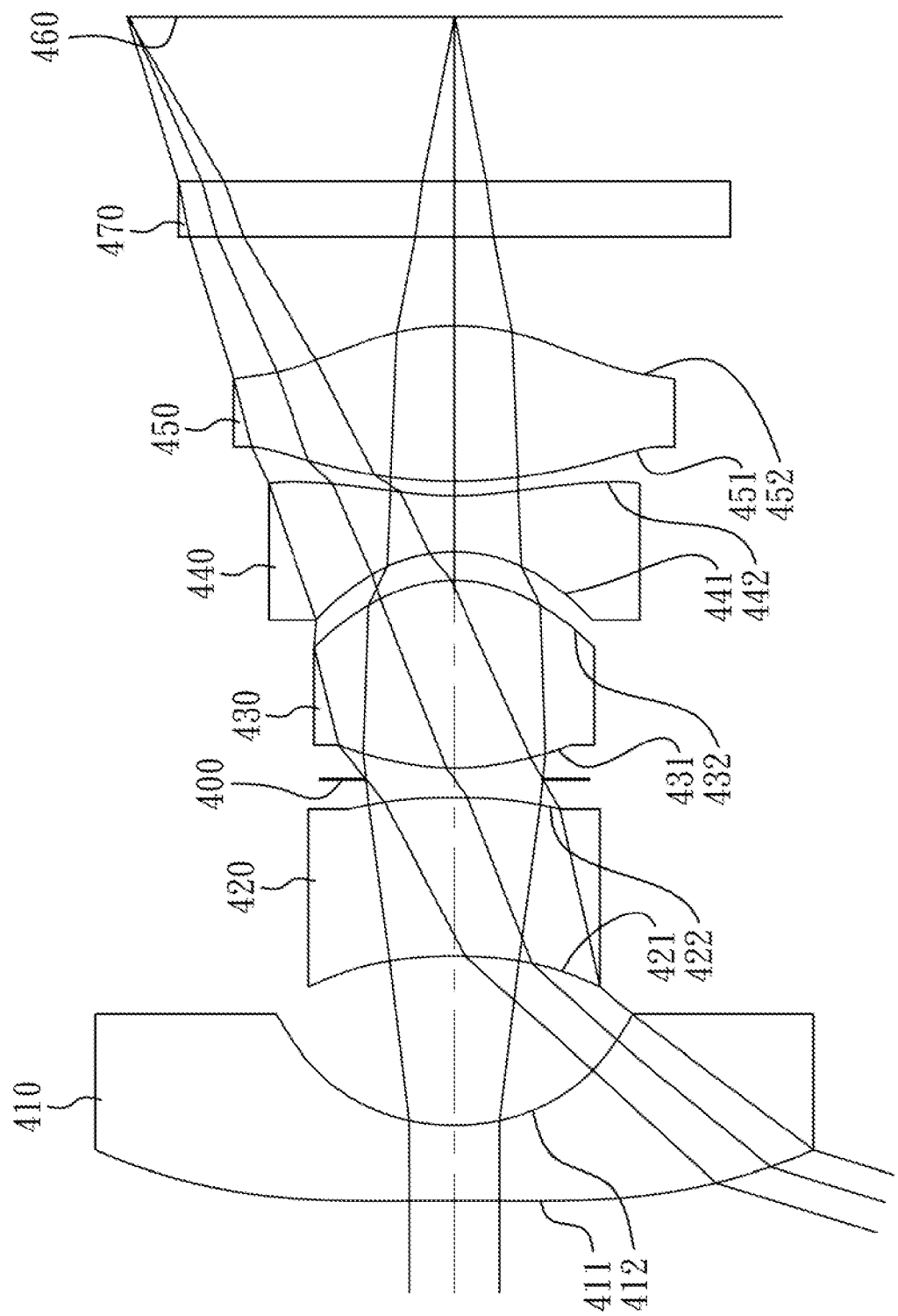
FIG. 7 is a schematic view of a wide-angle image capturing lens assembly according to the 4th embodiment of the present disclosure.
Figure 8:
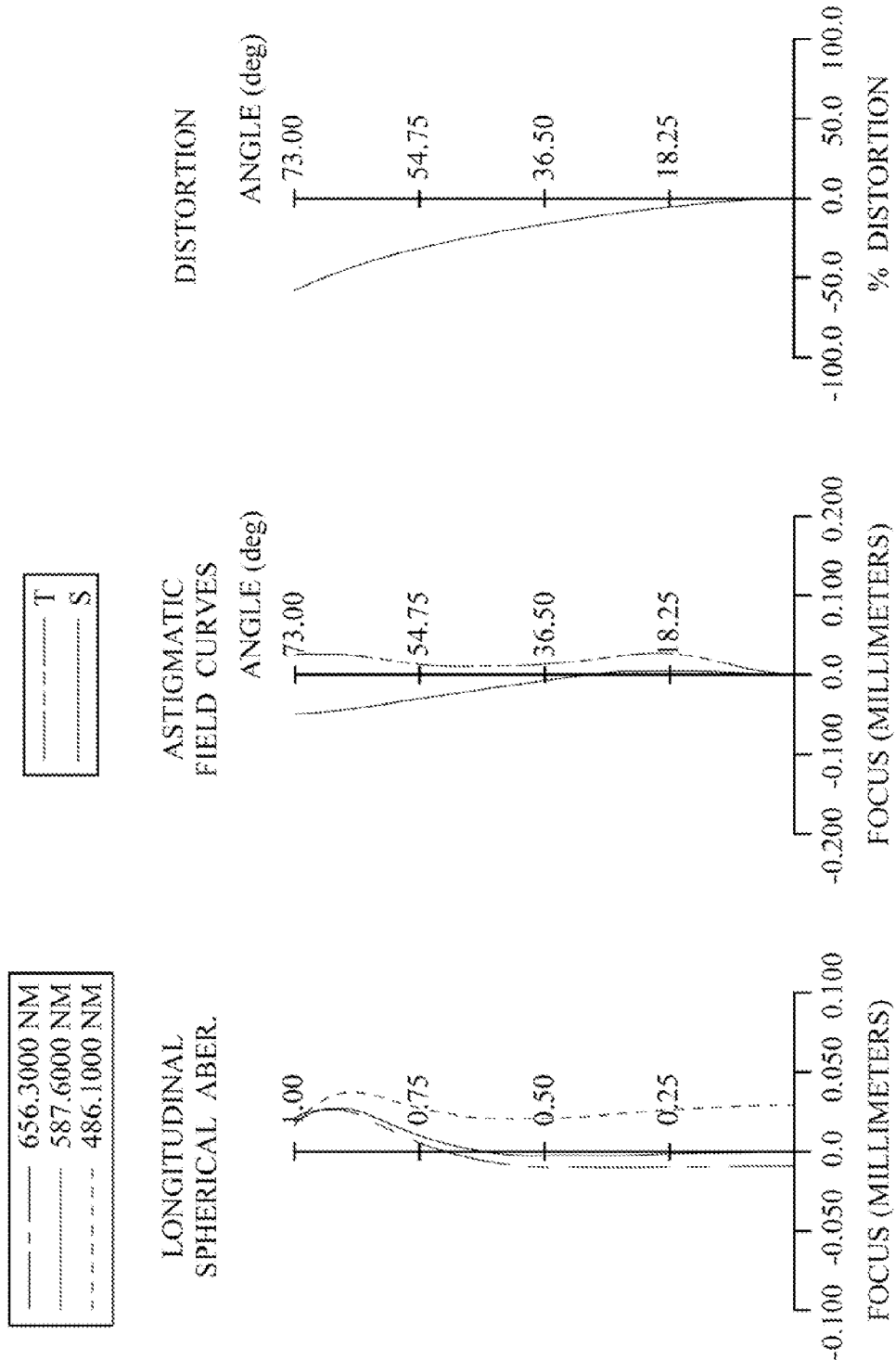
FIG. 8 shows spherical aberration curves, astigmatic field curves and a distortion curve of the wide-angle image capturing lens assembly according to the 4th embodiment.

FIG. 7 is a schematic view of a wide-angle image capturing lens assembly according to the 4th embodiment of the present disclosure. FIG. 8 shows spherical aberration curves, astigmatic field curves and a distortion curve of the wide-angle image capturing lens assembly according to the 4th embodiment. In FIG. 7, the wide-angle image capturing lens assembly includes, in order from an object side to an image side, a first lens element 410, a second lens element 420, an aperture stop 400, a third lens element 430, a fourth lens element 440, a fifth lens element 450, an IR-cut filter 470 and an image plane 460.

The first lens element 410 with negative refractive power has an object-side surface 411 being concave at a paraxial region thereof and an image-side surface 412 being concave at a paraxial region thereof. The first lens element 410 is made of plastic material and has the object-side surface 411 and the image-side surface 412 being both aspheric.

The second lens element 420 with negative refractive power has an object-side surface 421 being concave at a paraxial region thereof and an image-side surface 422 being convex at a paraxial region thereof. The second lens element 420 is made of plastic material and has the object-side surface 421 and the image-side surface 422 being both aspheric.

The third lens element 430 with positive refractive power has an object-side surface 431 being convex at a paraxial region thereof and an image-side surface 432 being convex at a paraxial region thereof. The third lens element 430 is made of plastic material and has the object-side surface 431 and the image-side surface 432 being both aspheric.

The fourth lens element 440 with negative refractive power has an object-side surface 441 being concave at a paraxial region thereof and an image-side surface 442 being concave at a paraxial region thereof, wherein the image-side surface 442 of the fourth lens element 440 changes from concave at the paraxial region thereof to convex at a peripheral region thereof. The fourth lens element 440 is made of plastic material and has the object-side surface 441 and the image-side surface 442 being both aspheric.

The fifth lens element 450 with positive refractive power has an object-side surface 451 being convex at a paraxial region thereof and an image-side surface 452 being convex at a paraxial region thereof. The fifth lens element 450 is made of plastic material and has the object-side surface 451 and the image-side surface 452 being both aspheric.

Each of the first through fifth lens elements (410-450) is a single and non-cemented lens element. The IR-cut filter 470 made of glass material is located between the fifth lens element 450 and the image plane 460, and will not affect the focal length of the wide-angle image capturing lens assembly.

The detailed optical data of the 4th embodiment are shown in Table 7 and the aspheric surface data are shown in Table 8 below.

TABLE 7

4th Embodiment
f = 1.29 mm, Fno = 2.62, HFOV = 73.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −37.860 | (ASP) | 0.408 | Plastic | 1.544 | 55.9 | −2.19 |
| 2 | | 1.234 | (ASP) | 0.918 | | | | |
| 3 | Lens 2 | −2.709 | (ASP) | 0.861 | Plastic | 1.583 | 30.2 | −19.71 |
| 4 | | −3.959 | (ASP) | 0.099 | | | | |
| 5 | Ape. Stop | Plano | | 0.060 | | | | |
| 6 | Lens 3 | 1.301 | (ASP) | 1.019 | Plastic | 1.544 | 55.9 | 1.08 |
| 7 | | −0.773 | (ASP) | 0.157 | | | | |
| 8 | Lens 4 | −0.934 | (ASP) | 0.300 | Plastic | 1.633 | 23.4 | −0.92 |
| 9 | | 1.756 | (ASP) | 0.079 | | | | |
| 10 | Lens 5 | 2.592 | (ASP) | 0.847 | Plastic | 1.535 | 55.7 | 1.81 |
| 11 | | −1.367 | (ASP) | 0.480 | | | | |
| 12 | IR-cut filter | Plano | | 0.300 | Glass | 1.517 | 64.2 | — |
| 13 | | Plano | | 0.897 | | | | |
| 14 | Image | Plano | | — | | | | |

Note:
Reference wavelength (d-line) is 587.6 nm.

TABLE 8

Aspheric Coefficients

| Surface # | 1 | 2 | 3 | 4 | 6 |
|---|---|---|---|---|---|
| k = | −2.5965E+01 | −2.4585E+00 | 1.5372E+00 | 3.2334E+01 | 2.0700E+00 |
| A4 = | 4.4771E−02 | 3.4404E−01 | −1.5681E−01 | −4.4262E−01 | −6.1292E−01 |
| A6 = | −8.8339E−03 | −2.7328E−01 | −1.2023E−01 | 1.4079E+00 | 8.2365E−01 |
| A8 = | 7.7209E−04 | 5.0387E−01 | 4.7393E−01 | −9.5944E−01 | −1.3938E+00 |
| A10 = | −9.6161E−07 | −2.5166E−01 | −2.7239E−01 | −1.2068E+00 | 9.0718E−02 |
| A12 = | −5.2548E−18 | −7.8977E−22 | −2.1346E−25 | 3.4444E+00 | |
| A14 = | −8.4447E−21 | −3.6739E−28 | | | |
| A16 = | 1.0952E−23 | | | | |

| Surface # | 7 | 8 | 9 | 10 | 11 |
|---|---|---|---|---|---|
| k = | −7.8312E−01 | −9.1857E+00 | −3.0155E+00 | −1.4565E+01 | −2.6076E−02 |
| A4 = | 1.9752E−01 | −1.7251E+00 | −4.6715E−01 | 6.6112E−02 | 2.5456E−02 |
| A6 = | −1.9070E+00 | 3.2961E+00 | 6.7152E−01 | 4.5940E−02 | 8.3617E−02 |
| A8 = | 1.4186E+01 | −1.7457E+00 | −6.8667E−01 | −4.4832E−01 | 2.3960E−01 |
| A10 = | −5.3891E+01 | −2.7232E+00 | 4.4974E−01 | 1.0246E+00 | −2.4229E−01 |
| A12 = | 1.1548E+02 | 2.5900E+00 | −1.4875E−01 | −1.1674E+00 | 6.4789E−02 |
| A14 = | −1.3364E+02 | | | 6.6532E−01 | 5.0261E−27 |
| A16 = | 6.4547E+01 | | | −1.5491E−01 | |

In the wide-angle image capturing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| | |
|---|---|
| f (mm) | 1.29 |
| Fno | 2.62 |
| HFOV (deg.) | 73.0 |
| Dr2r3/CT1 | 2.250 |
| Dr4r5/Dr2r3 | 0.173 |
| Dr1r4/Dr5r10 | 0.910 |
| ΣCT/Td | 0.723 |
| TL (mm) | 6.425 |
| \|R6/R7\| | 0.83 |
| (R7 + R8)/(R7 − R8) | −0.31 |
| (R9 + R10)/(R9 − R10) | 0.31 |
| f/f1 | −0.588 |
| \|f/f2\| | 0.065 |
| FOV (deg.) | 146.0 |

5th Embodiment

Figure 9:
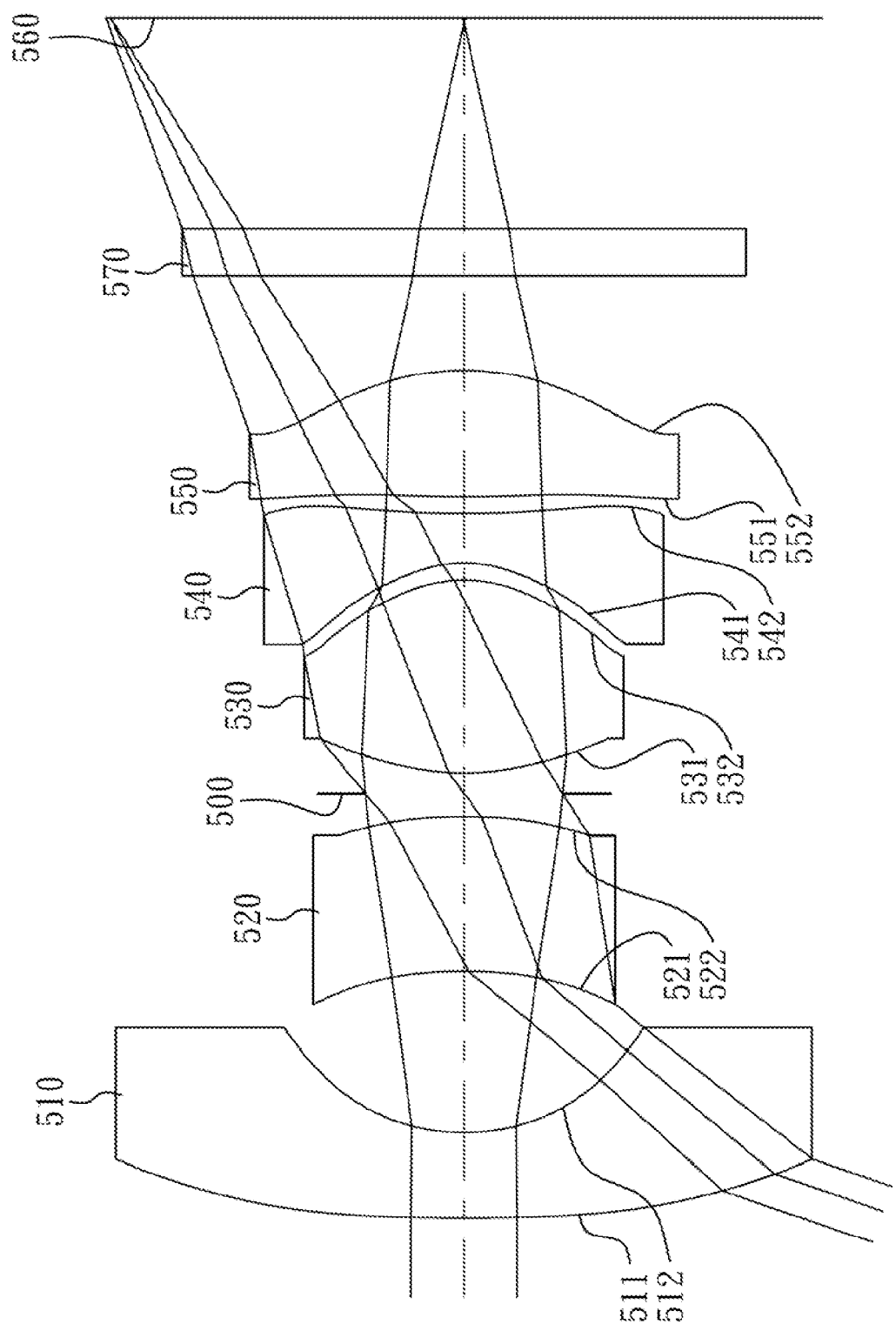
FIG. 9 is a schematic view of a wide-angle image capturing lens assembly according to the 5th embodiment of the present disclosure.
Figure 10:
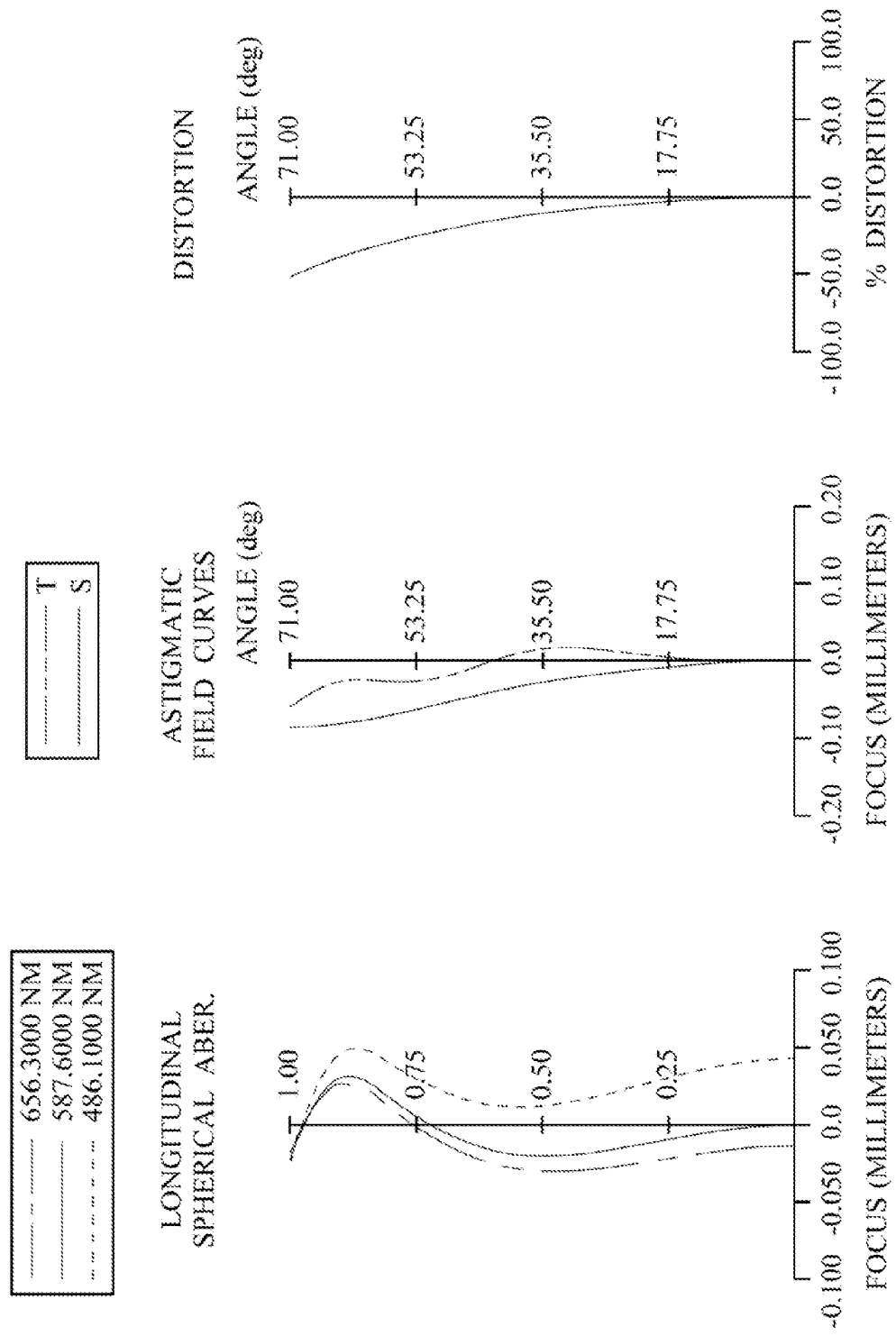
FIG. 10 shows spherical aberration curves, astigmatic field curves and a distortion curve of the wide-angle image capturing lens assembly according to the 5th embodiment.

FIG. 9 is a schematic view of a wide-angle image capturing lens assembly according to the 5th embodiment of the present disclosure. FIG. 10 shows spherical aberration curves, astigmatic field curves and a distortion curve of the wide-angle image capturing lens assembly according to the 5th embodiment. In FIG. 9, the wide-angle image capturing lens assembly includes, in order from an object side to an image side, a first lens element 510, a second lens element 520, an aperture stop 500, a third lens element 530, a fourth lens element 540, a fifth lens element 550, an IR-cut filter 570 and an image plane 560.

The first lens element 510 with negative refractive power has an object-side surface 511 being convex at a paraxial region thereof and an image-side surface 512 being concave at a paraxial region thereof. The first lens element 510 is made of plastic material and has the object-side surface 511 and the image-side surface 512 being both aspheric.

The second lens element 520 with negative refractive power has an object-side surface 521 being concave at a paraxial region thereof and an image-side surface 522 being convex at a paraxial region thereof. The second lens element 520 is made of plastic material and has the object-side surface 521 and the image-side surface 522 being both aspheric.

The third lens element 530 with positive refractive power has an object-side surface 531 being convex at a paraxial region thereof and an image-side surface 532 being convex at a paraxial region thereof. The third lens element 530 is made of plastic material and has the object-side surface 531 and the image-side surface 532 being both aspheric.

The fourth lens element 540 with negative refractive power has an object-side surface 541 being concave at a paraxial region thereof and an image-side surface 542 being concave at a paraxial region thereof, wherein the image-side surface 542 of the fourth lens element 540 changes from concave at the paraxial region thereof to convex at a peripheral region thereof. The fourth lens element 540 is made of plastic material and has the object-side surface 541 and the image-side surface 542 being both aspheric.

The fifth lens element 550 with positive refractive power has an object-side surface 551 being convex at a paraxial region thereof and an image-side surface 552 being convex at a paraxial region thereof. The fifth lens element 550 is made of plastic material and has the object-side surface 551 and the image-side surface 552 being both aspheric.

Each of the first through fifth lens elements (510-550) is a single and non-cemented lens element. The IR-cut filter 570 made of glass material is located between the fifth lens element 550 and the image plane 560, and will not affect the focal length of the wide-angle image capturing lens assembly.

The detailed optical data of the 5th embodiment are shown in Table 9 and the aspheric surface data are shown in Table 10 below.

TABLE 9

5th Embodiment
f = 1.61 mm, Fno = 2.38, HFOV = 71.0 deg.

| Surface # |  | Curvature Radius |  | Thickness | Material | Index | Abbe # | Focal length |
|---|---|---|---|---|---|---|---|---|
| 0 | Object | Plano |  | Infinity |  |  |  |  |
| 1 | Lens 1 | 15.846 | (ASP) | 0.542 | Plastic | 1.544 | 55.9 | −2.70 |
| 2 |  | 1.328 | (ASP) | 1.028 |  |  |  |  |
| 3 | Lens 2 | −3.132 | (ASP) | 0.982 | Plastic | 1.634 | 23.8 | −81.18 |
| 4 |  | −3.741 | (ASP) | 0.148 |  |  |  |  |
| 5 | Ape. Stop | Plano |  | 0.131 |  |  |  |  |
| 6 | Lens 3 | 1.569 | (ASP) | 1.227 | Plastic | 1.544 | 55.9 | 1.21 |
| 7 |  | −0.819 | (ASP) | 0.108 |  |  |  |  |
| 8 | Lens 4 | −0.802 | (ASP) | 0.311 | Plastic | 1.633 | 23.4 | −1.11 |
| 9 |  | 6.353 | (ASP) | 0.107 |  |  |  |  |
| 10 | Lens 5 | 6.197 | (ASP) | 0.805 | Plastic | 1.535 | 55.7 | 2.51 |
| 11 |  | −1.637 | (ASP) | 0.600 |  |  |  |  |
| 12 | IR-cut filter | Plano |  | 0.300 | Glass | 1.517 | 64.2 | — |
| 13 |  | Plano |  | 1.342 |  |  |  |  |
| 14 | Image | Plano |  | — |  |  |  |  |

Note:
Reference wavelength (d-line) is 587.6 nm.

TABLE 10

Aspheric Coefficients

| Surface # | 1 | 2 | 3 | 4 | 6 |
|---|---|---|---|---|---|
| k = | 2.8691E+01 | −1.4137E+00 | 8.1558E+00 | 1.6319E+01 | −3.0419E−01 |
| A4 = | 1.7750E−02 | 1.0582E−01 | −7.0099E−02 | −1.5250E−01 | −1.9400E−01 |
| A6 = | −2.9481E−03 | −2.9233E−03 | 1.4777E−02 | 1.7029E−01 | 1.8186E−01 |
| A8 = | 1.8809E−04 | 4.1716E−02 | 5.2368E−02 | 2.2705E−01 | −1.3214E−01 |
| A10 = |  | −2.3046E−02 | 2.0110E−02 | −2.3598E−01 | 5.9326E−02 |
| A12 = |  |  |  | −2.4402E−06 |  |

| Surface # | 7 | 8 | 9 | 10 | 11 |
|---|---|---|---|---|---|
| k = | −9.3036E−01 | −4.0122E+00 | −9.0000E+01 | 1.5972E+01 | −6.3169E+00 |
| A4 = | 2.5783E−01 | −3.2570E−01 | 2.2894E−02 | −1.9414E−01 | −1.5851E−01 |
| A6 = | −2.0345E−02 | 9.3209E−01 | 7.6627E−03 | 2.3080E−01 | 1.2235E−01 |
| A8 = | −4.4255E−01 | −1.9794E+00 | −9.8759E−02 | −2.1438E−01 | −8.7351E−02 |
| A10 = | 3.5139E−01 | 1.7441E+00 | 7.4135E−02 | 1.1285E−01 | 5.8899E−02 |
| A12 = |  | −5.0379E−01 | −1.8425E−02 | −2.4169E−02 | −1.3198E−02 |

In the wide-angle image capturing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| | |
|---|---|
| f (mm) | 1.61 |
| Fno | 2.38 |
| HFOV (deg.) | 71.0 |
| Dr2r3/CT1 | 1.897 |
| Dr4r5/Dr2r3 | 0.271 |
| Dr1r4/Dr5r10 | 0.998 |
| ΣCT/Td | 0.718 |
| TL (mm) | 7.631 |
| |R6/R7| | 1.02 |
| (R7 + R8)/(R7 − R8) | −0.78 |
| (R9 + R10)/(R9 − R10) | 0.58 |
| f/f1 | −0.595 |
| |f/f2| | 0.020 |
| FOV (deg.) | 142.0 |

6th Embodiment

Figure 11:
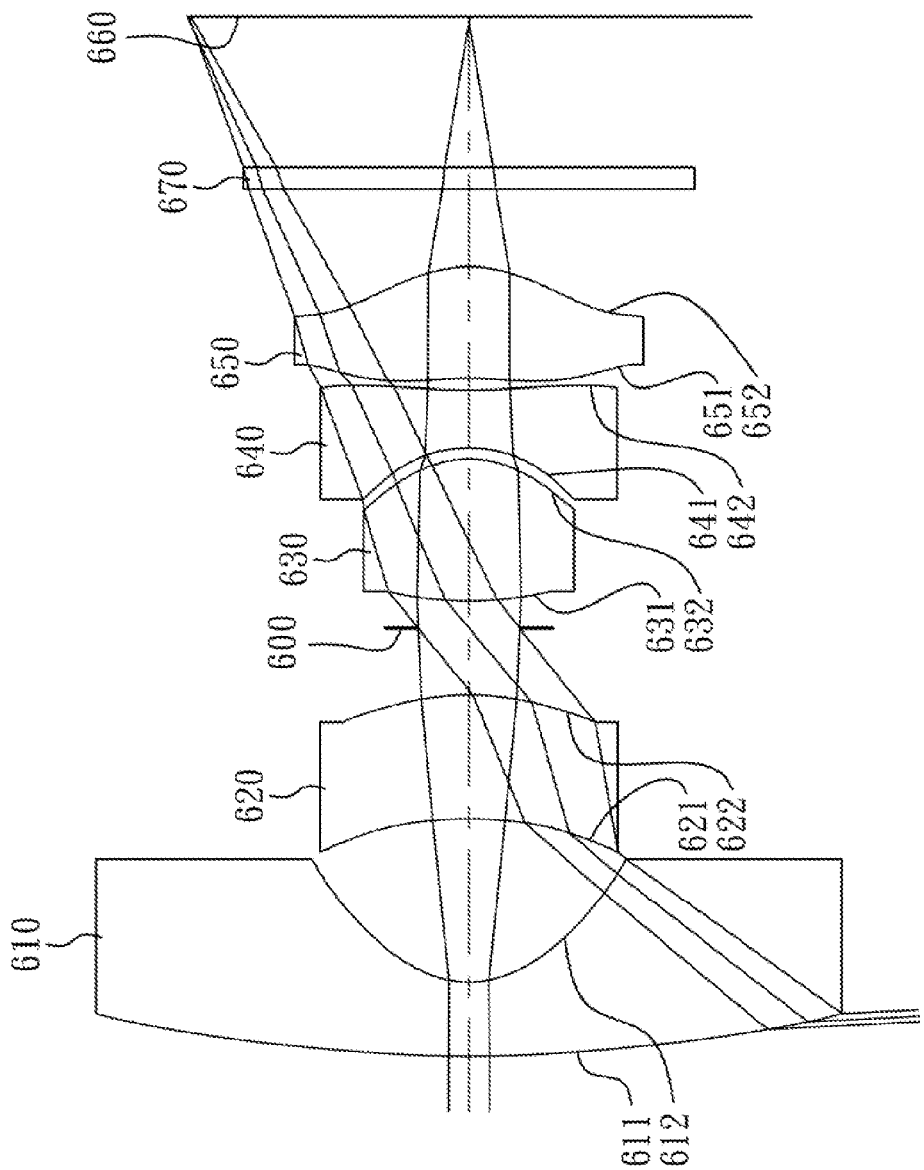
FIG. 11 is a schematic view of a wide-angle image capturing lens assembly according to the 6th embodiment of the present disclosure.
Figure 12:
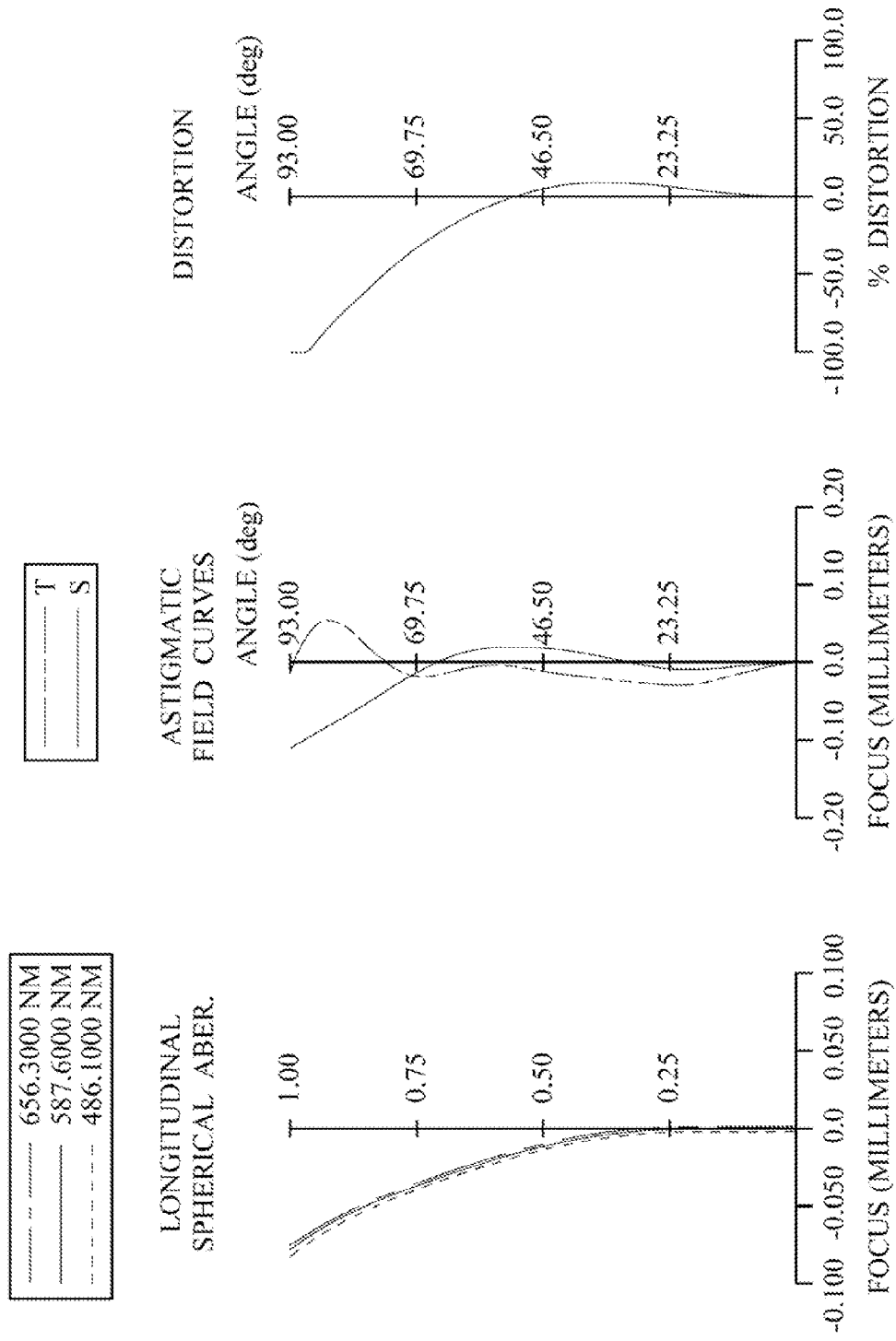
FIG. 12 shows spherical aberration curves, astigmatic field curves and a distortion curve of the wide-angle image capturing lens assembly according to the 6th embodiment.

FIG. 11 is a schematic view of a wide-angle image capturing lens assembly according to the 6th embodiment of the present disclosure. FIG. 12 shows spherical aberration curves, astigmatic field curves and a distortion curve of the wide-angle image capturing lens assembly according to the 6th embodiment. In FIG. 11, the wide-angle image capturing lens assembly includes, in order from an object side to an image side, a first lens element 610, a second lens element 620, an aperture stop 600, a third lens element 630, a fourth lens element 640, a fifth lens element 650, an IR-cut filter 670 and an image plane 660.

The first lens element 610 with negative refractive power has an object-side surface 611 being convex at a paraxial region thereof and an image-side surface 612 being concave at a paraxial region thereof. The first lens element 610 is made of glass material and has the object-side surface 611 and the image-side surface 612 being both aspheric.

The second lens element 620 with positive refractive power has an object-side surface 621 being concave at a paraxial region thereof and an image-side surface 622 being convex at a paraxial region thereof. The second lens element 620 is made of plastic material and has the object-side surface 621 and the image-side surface 622 being both aspheric.

The third lens element 630 with positive refractive power has an object-side surface 631 being convex at a paraxial region thereof and an image-side surface 632 being convex at a paraxial region thereof. The third lens element 630 is made of plastic material and has the object-side surface 631 and the image-side surface 632 being both aspheric.

The fourth lens element 640 with negative refractive power has an object-side surface 641 being concave at a paraxial region thereof and an image-side surface 642 being concave at a paraxial region thereof, wherein the image-side surface 642 of the fourth lens element 640 changes from concave at the paraxial region thereof to convex at a peripheral region thereof. The fourth lens element 640 is made of plastic material and has the object-side surface 641 and the image-side surface 642 being both aspheric.

The fifth lens element 650 with positive refractive power has an object-side surface 651 being concave at a paraxial region thereof and an image-side surface 652 being convex at a paraxial region thereof. The fifth lens element 650 is made of plastic material and has the object-side surface 651 and the image-side surface 652 being both aspheric.

Each of the first through fifth lens elements (610-650) is a single and non-cemented lens element. The IR-cut filter 670 made of glass material is located between the fifth lens element 650 and the image plane 660, and will not affect the focal length of the wide-angle image capturing lens assembly.

The detailed optical data of the 6th embodiment are shown in Table 11 and the aspheric surface data are shown in Table 12 below.

TABLE 11

6th Embodiment
f = 1.12 mm, Fno = 3.05, HFOV = 93.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 10.520 | (ASP) | 0.676 | Plastic | 1.542 | 62.9 | −1.82 |
| 2 | | 0.882 | (ASP) | 1.479 | | | | |
| 3 | Lens 2 | −4.336 | (ASP) | 1.123 | Plastic | 1.650 | 21.4 | 7.15 |
| 4 | | −2.471 | (ASP) | 0.604 | | | | |
| 5 | Ape. Stop | Plano | | 0.244 | | | | |
| 6 | Lens 3 | 3.446 | (ASP) | 1.292 | Plastic | 1.544 | 55.9 | 1.41 |
| 7 | | −0.858 | (ASP) | 0.097 | | | | |
| 8 | Lens 4 | −1.288 | (ASP) | 0.525 | Plastic | 1.633 | 23.4 | −1.54 |
| 9 | | 4.651 | (ASP) | 0.103 | | | | |
| 10 | Lens 5 | −2.725 | (ASP) | 1.015 | Plastic | 1.535 | 55.7 | 3.00 |
| 11 | | −1.140 | (ASP) | 0.700 | | | | |
| 12 | IR-cut filter | Plano | | 0.200 | Glass | 1.517 | 64.2 | — |
| 13 | | Plano | | 1.368 | | | | |
| 14 | Image | Plano | | — | | | | |

Note:
Reference wavelength (d-line) is 587.6 nm.

TABLE 12

Aspheric Coefficients

| Surface # | 1 | 2 | 3 | 4 | 6 |
|---|---|---|---|---|---|
| k = | −9.0000E+01 | −6.8414E−01 | −1.5955E+01 | −8.4773E+00 | −7.5268E+01 |
| A4 = | 8.5577E−04 | −1.3313E−01 | −8.0117E−02 | −6.9567E−02 | 2.4258E−01 |

TABLE 12-continued

| Aspheric Coefficients | | | | |
|---|---|---|---|---|
| A6 = | 1.3485E−05 | 5.1249E−02 | 1.7131E−02 | 5.6870E−02 | −5.0229E−01 |
| A8 = | −3.1136E−10 | −2.2369E−02 | 8.4255E−03 | −2.1411E−02 | 6.7375E−01 |
| A10 = | | | −3.4391E−03 | 2.1162E−03 | −3.0405E−01 |
| A12 = | | | | −4.4773E−07 | |

| Surface # | 7 | 8 | 9 | 10 | 11 |
|---|---|---|---|---|---|
| k = | −5.1478E+00 | −9.5569E+00 | 8.7191E+00 | −8.0506E+01 | −2.8610E+00 |
| A4 = | −4.9406E−01 | −6.9637E−01 | −1.6546E−01 | 1.5605E−01 | 8.4597E−03 |
| A6 = | 7.0498E−01 | 7.9094E−01 | 1.5494E−01 | −7.3179E−02 | −1.1474E−02 |
| A8 = | −7.4857E−01 | −8.0455E−01 | −1.0524E−01 | 1.4619E−02 | 3.7886E−02 |
| A10 = | 3.7206E−01 | 5.7792E−01 | 3.5987E−02 | 1.1129E−03 | −1.6067E−02 |
| A12 = | | −1.4910E−01 | −5.6240E−03 | −1.0167E−03 | 1.8890E−03 |

In the wide-angle image capturing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | |
|---|---|
| f (mm) | 1.12 |
| Fno | 3.05 |
| HFOV (deg.) | 93.0 |
| Dr2r3/CT1 | 2.188 |
| Dr4r5/Dr2r3 | 0.573 |
| Dr1r4/Dr5r10 | 1.081 |
| ΣCT/Td | 0.647 |
| TL (mm) | 9.426 |
| |R6/R7| | 0.67 |
| (R7 + R8)/(R7 − R8) | −0.57 |
| (R9 + R10)/(R9 − R10) | 2.44 |
| f/f1 | −0.618 |
| |f/f2| | 0.157 |
| FOV (deg.) | 186.0 |

7th Embodiment

Figure 13:
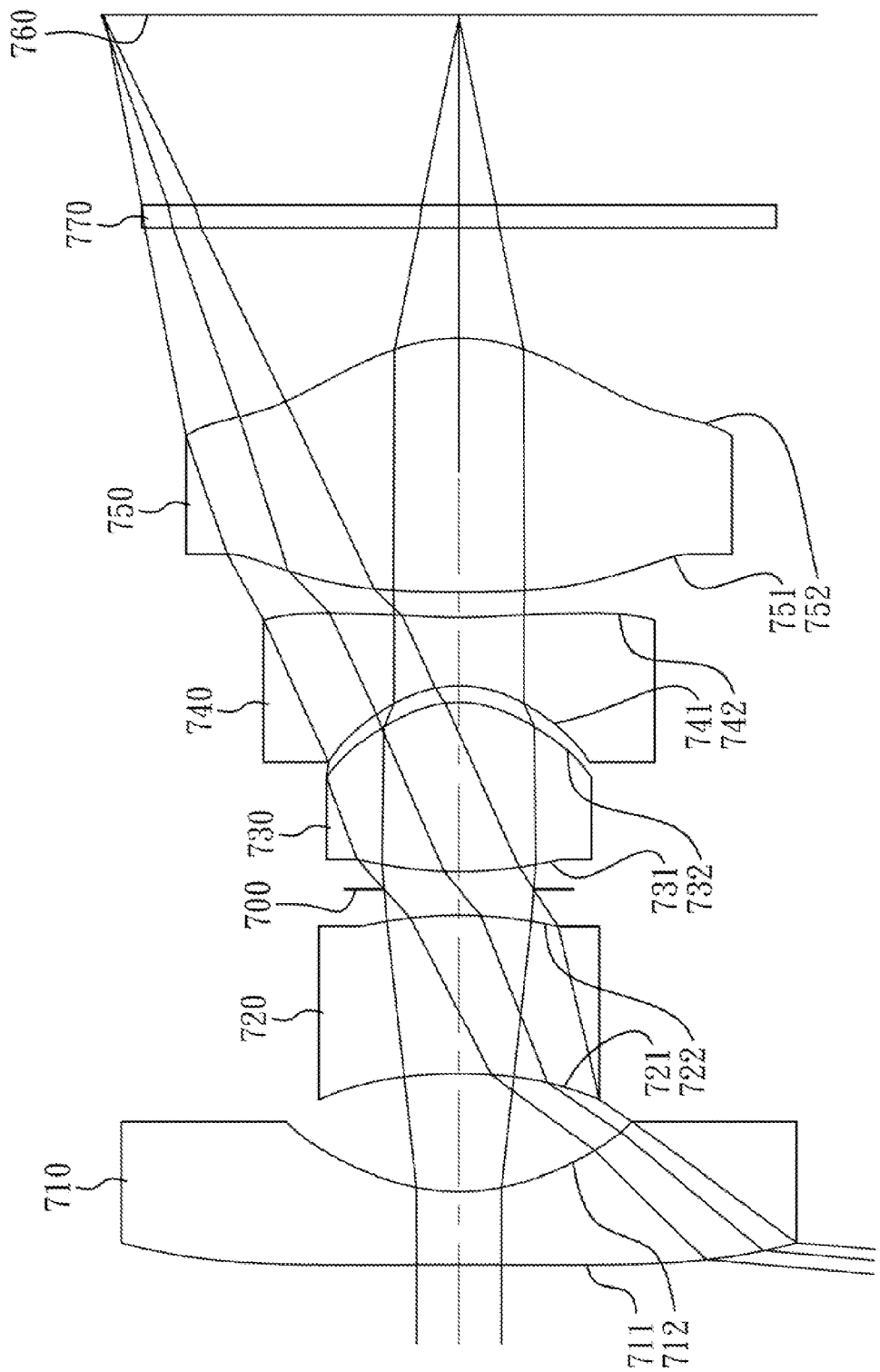
FIG. 13 is a schematic view of a wide-angle image capturing lens assembly according to the 7th embodiment of the present disclosure.
Figure 14:
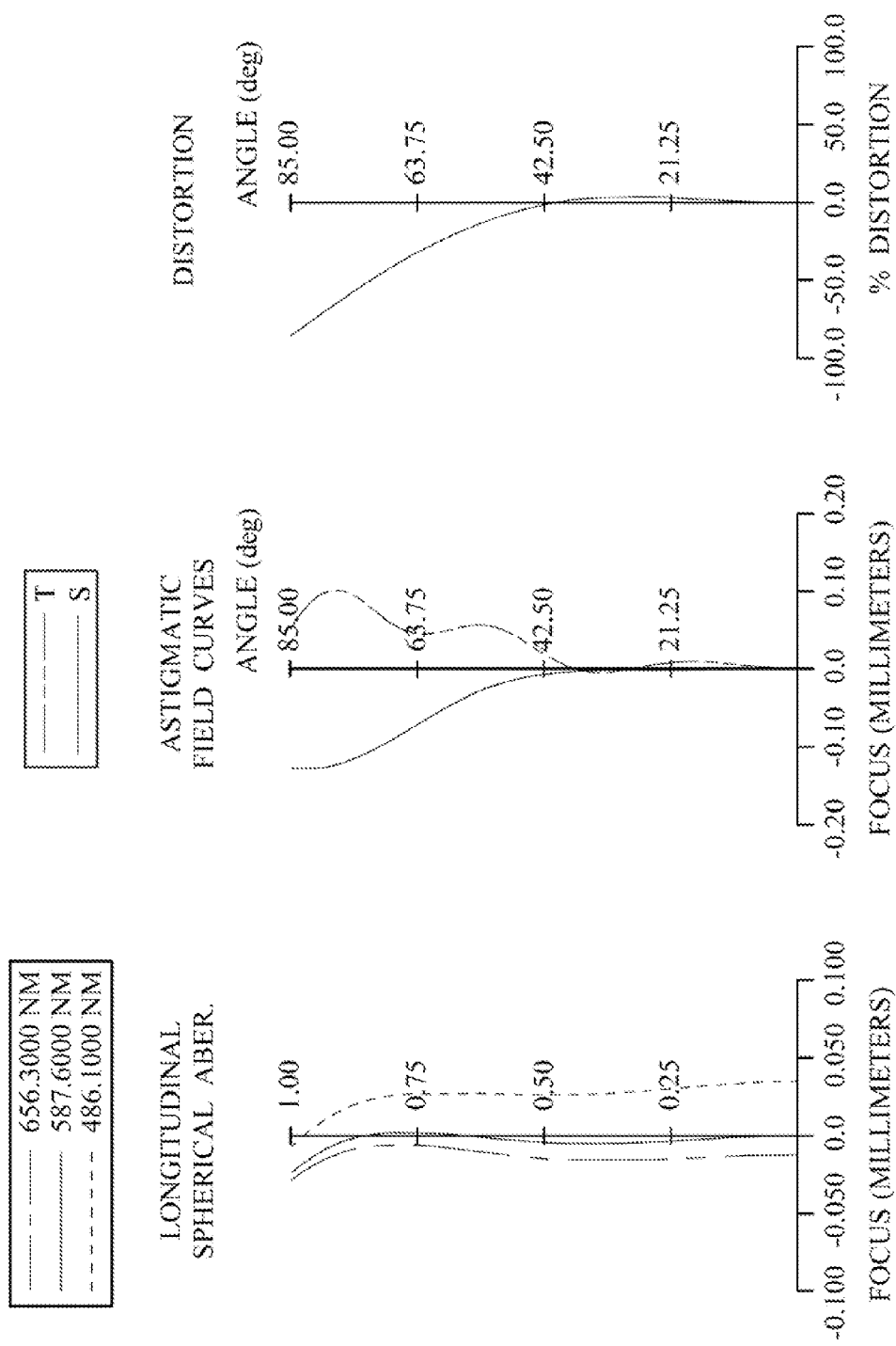
FIG. 14 shows spherical aberration curves, astigmatic field curves and a distortion curve of the wide-angle image capturing lens assembly according to the 7th embodiment.

FIG. 13 is a schematic view of a wide-angle image capturing lens assembly according to the 7th embodiment of the present disclosure. FIG. 14 shows spherical aberration curves, astigmatic field curves and a distortion curve of the wide-angle image capturing lens assembly according to the 7th embodiment. In FIG. 13, the wide-angle image capturing lens assembly includes, in order from an object side to an image side, a first lens element 710, a second lens element 720, an aperture stop 700, a third lens element 730, a fourth lens element 740, a fifth lens element 750, an IR-cut filter 770 and an image plane 760.

The first lens element 710 with negative refractive power has an object-side surface 711 being concave at a paraxial region thereof and an image-side surface 712 being concave at a paraxial region thereof. The first lens element 710 is made of plastic material and has the object-side surface 711 and the image-side surface 712 being both aspheric.

The second lens element 720 with positive refractive power has an object-side surface 721 being concave at a paraxial region thereof and an image-side surface 722 being convex at a paraxial region thereof. The second lens element 720 is made of plastic material and has the object-side surface 721 and the image-side surface 722 being both aspheric.

The third lens element 730 with positive refractive power has an object-side surface 731 being convex at a paraxial region thereof and an image-side surface 732 being convex at a paraxial region thereof. The third lens element 730 is made of plastic material and has the object-side surface 731 and the image-side surface 732 being both aspheric.

The fourth lens element 740 with negative refractive power has an object-side surface 741 being concave at a paraxial region thereof and an image-side surface 742 being concave at a paraxial region thereof, wherein the image-side surface 742 of the fourth lens element 740 changes from concave at the paraxial region thereof to convex at a peripheral region thereof. The fourth lens element 740 is made of plastic material and has the object-side surface 741 and the image-side surface 742 being both aspheric.

The fifth lens element 750 with positive refractive power has an object-side surface 751 being convex at a paraxial region thereof and an image-side surface 752 being convex at a paraxial region thereof. The fifth lens element 750 is made of plastic material and has the object-side surface 751 and the image-side surface 752 being both aspheric.

Each of the first through fifth lens elements (710-750) is a single and non-cemented lens element. The IR-cut filter 770 made of glass material is located between the fifth lens element 750 and the image plane 760, and will not affect the focal length of the wide-angle image capturing lens assembly.

The detailed optical data of the 7th embodiment are shown in Table 13 and the aspheric surface data are shown in Table 14 below.

TABLE 13

7th Embodiment
f = 1.38 mm, Fno = 2.55, HFOV = 85.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −69.630 | (ASP) | 0.468 | Plastic | 1.544 | 55.9 | −2.43 |
| 2 | | 1.353 | (ASP) | 0.748 | | | | |
| 3 | Lens 2 | −3.629 | (ASP) | 1.006 | Plastic | 1.640 | 23.3 | 17.40 |
| 4 | | −3.033 | (ASP) | 0.164 | | | | |

TABLE 13-continued

7th Embodiment
f = 1.38 mm, Fno = 2.55, HFOV = 85.0 deg.

| Surface # | | Curvature Radius | | Thickness | Material | Index | Abbe # | Focal length |
|---|---|---|---|---|---|---|---|---|
| 5 | Ape. Stop | Plano | | 0.111 | | | | |
| 6 | Lens 3 | 2.490 | (ASP) | 1.079 | Plastic | 1.544 | 55.9 | 1.11 |
| 7 | | −0.675 | (ASP) | 0.104 | | | | |
| 8 | Lens 4 | −0.804 | (ASP) | 0.435 | Plastic | 1.640 | 23.3 | −0.97 |
| 9 | | 3.352 | (ASP) | 0.161 | | | | |
| 10 | Lens 5 | 11.326 | (ASP) | 1.613 | Plastic | 1.535 | 55.7 | 2.00 |
| 11 | | −1.125 | (ASP) | 0.700 | | | | |
| 12 | IR-cut filter | Plano | | 0.145 | Glass | 1.517 | 64.2 | — |
| 13 | | Plano | | 1.208 | | | | |
| 14 | Image | Plano | | — | | | | |

Note:
Reference wavelength (d-line) is 587.6 nm.

TABLE 14

Aspheric Coefficients

| Surface # | 1 | 2 | 3 | 4 | 6 |
|---|---|---|---|---|---|
| k = | −1.0000E+00 | 2.7160E−01 | 9.2593E+00 | −1.8034E+00 | 4.9574E+00 |
| A4 = | 8.4082E−03 | −1.2577E−01 | −1.1074E−01 | −9.2430E−02 | −9.6406E−02 |
| A6 = | −4.4384E−05 | 3.5277E−02 | 6.0708E−02 | 2.1750E−01 | −7.1210E−02 |
| A8 = | 6.3576E−06 | −3.1816E−02 | 5.8442E−02 | −1.1644E−01 | 5.5451E−01 |
| A10 = | | | −3.7872E−02 | −1.2527E−01 | −1.0448E+00 |
| A12 = | | | 1.0307E−33 | −3.5431E−06 | |

| Surface # | 7 | 8 | 9 | 10 | 11 |
|---|---|---|---|---|---|
| k = | −7.3491E−01 | −2.8573E+00 | −8.5350E+01 | 3.8240E+01 | −1.1830E+00 |
| A4 = | 3.4239E−01 | −8.5311E−01 | −2.3671E−01 | 7.7224E−02 | 6.4481E−02 |
| A6 = | 1.9194E−01 | 2.1102E+00 | 4.8500E−01 | 1.0430E−02 | −1.4331E−03 |
| A8 = | −5.9616E−01 | −2.7411E+00 | −4.9424E−01 | −4.7963E−02 | 2.1535E−02 |
| A10 = | 1.2662E−01 | 9.9248E−01 | 2.3620E−01 | 2.6015E−02 | −1.1063E−02 |
| A12 = | | 2.0988E−02 | −4.4506E−02 | −5.2010E−03 | 1.3613E−03 |

In the wide-angle image capturing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| | |
|---|---|
| f (mm) | 1.38 |
| Fno | 2.55 |
| HFOV (deg.) | 85.0 |
| Dr2r3/CT1 | 1.598 |
| Dr4r5/Dr2r3 | 0.368 |
| Dr1r4/Dr5r10 | 0.655 |
| ΣCT/Td | 0.781 |
| TL (mm) | 7.942 |
| |R6/R7| | 0.84 |
| (R7 + R8)/(R7 − R8) | −0.61 |
| (R9 + R10)/(R9 − R10) | 0.82 |
| f/f1 | −0.565 |
| |f/f2| | 0.079 |
| FOV (deg.) | 170.0 |

8th Embodiment

Figure 15:
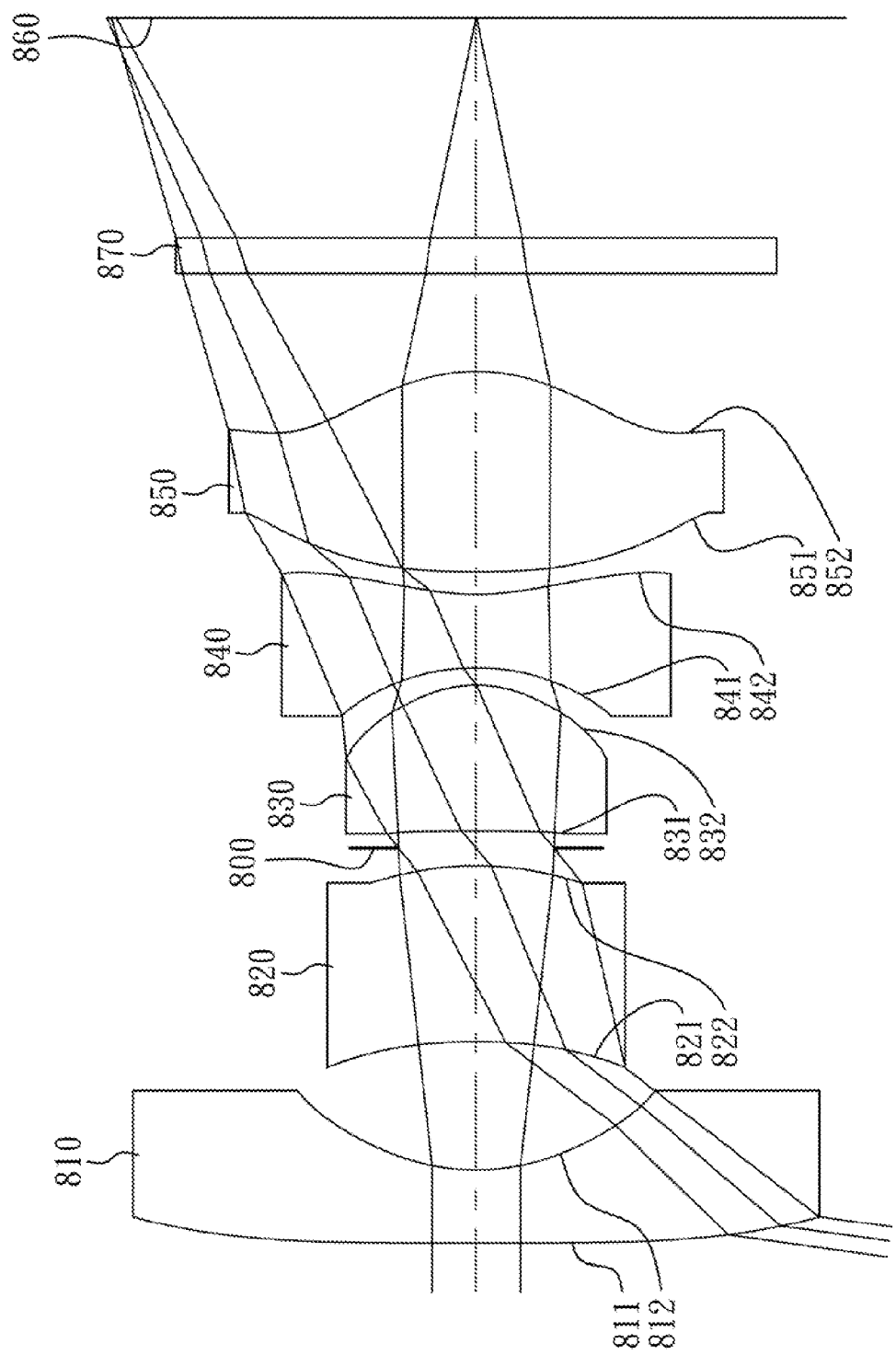
FIG. 15 is a schematic view of a wide-angle image capturing lens assembly according to the 8th embodiment of the present disclosure.
Figure 16:
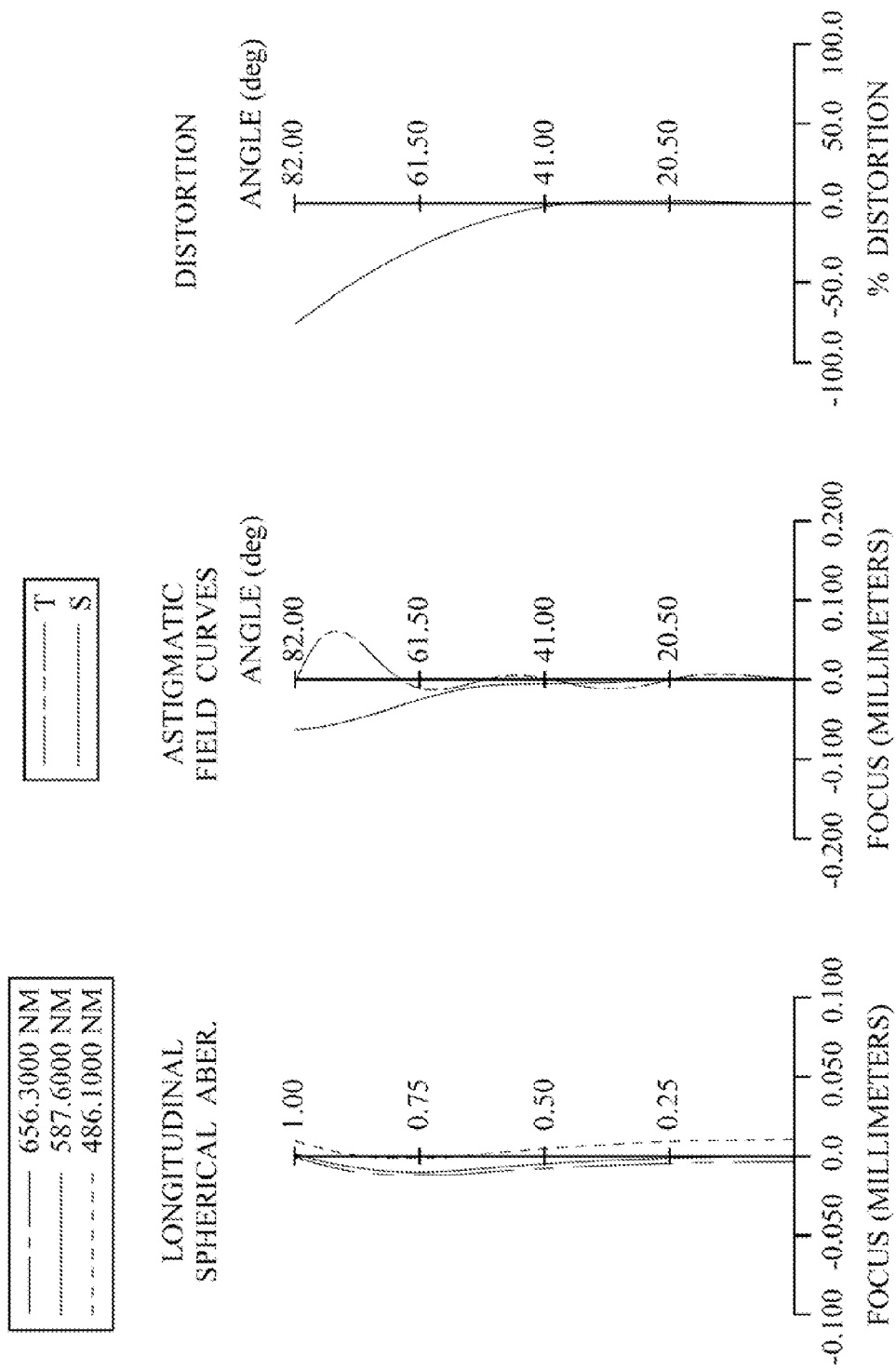
FIG. 16 shows spherical aberration curves, astigmatic field curves and a distortion curve of the wide-angle image capturing lens assembly according to the 8th embodiment.

FIG. 15 is a schematic view of a wide-angle image capturing lens assembly according to the 8th embodiment of the present disclosure. FIG. 16 shows spherical aberration curves, astigmatic field curves and a distortion curve of the wide-angle image capturing lens assembly according to the 8th embodiment. In FIG. 15, the wide-angle image capturing lens assembly includes, in order from an object side to an image side, a first lens element 810, a second lens element 820, an aperture stop 800, a third lens element 830, a fourth lens element 840, a fifth lens element 850, an IR-cut filter 870 and an image plane 860.

The first lens element 810 with negative refractive power has an object-side surface 811 being plane at a paraxial region thereof and an image-side surface 812 being concave at a paraxial region thereof. The first lens element 810 is made of plastic material and has the object-side surface 811 and the image-side surface 812 being both aspheric.

The second lens element 820 with positive refractive power has an object-side surface 821 being concave at a paraxial region thereof and an image-side surface 822 being convex at a paraxial region thereof. The second lens element 820 is made of plastic material and has the object-side surface 821 and the image-side surface 822 being both aspheric.

The third lens element 830 with positive refractive power has an object-side surface 831 being concave at a paraxial region thereof and an image-side surface 832 being convex at a paraxial region thereof. The third lens element 830 is made of plastic material and has the object-side surface 831 and the image-side surface 832 being both aspheric.

The fourth lens element 840 with negative refractive power has an object-side surface 841 being concave at a paraxial region thereof and an image-side surface 842 being concave at a paraxial region thereof, wherein the image-side surface 842 of the fourth lens element 840 changes from concave at the paraxial region thereof to convex at a peripheral region thereof. The fourth lens element 840 is made of plastic material and has the object-side surface 841 and the image-side surface 842 being both aspheric.

The fifth lens element 850 with positive refractive power has an object-side surface 851 being convex at a paraxial region thereof and an image-side surface 852 being convex at a paraxial region thereof, wherein the image-side surface 852 of the fifth lens element 850 is inclined toward the image side of the wide-angle image capturing lens assembly at an end of a peripheral region of the image-side surface 852 of the fifth lens element 850 which within a location of a maximum effective radius thereof (Since the image-side surface 852 of the fifth lens element 850 has the similar surface changes as the image-side surface 352 of the fifth lens element 350, the illustration regarding this will not be provided again. Therefore, please also refer to FIG. 17.). The fifth lens element 850 is made of plastic material and has the object-side surface 851 and the image-side surface 852 being both aspheric.

Each of the first through fifth lens elements (810-850) is a single and non-cemented lens element. The IR-cut filter 870 made of glass material is located between the fifth lens element 850 and the image plane 860, and will not affect the focal length of the wide-angle image capturing lens assembly.

The detailed optical data of the 8th embodiment are shown in Table 15 and the aspheric surface data are shown in Table 16 below.

TABLE 15

8th Embodiment
f = 0.88 mm, Fno = 2.45, HFOV = 82.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | ∞ | (ASP) | 0.300 | Plastic | 1.544 | 55.9 | −1.60 |
| 2 | | 0.872 | (ASP) | 0.523 | | | | |
| 3 | Lens 2 | −2.398 | (ASP) | 0.717 | Plastic | 1.640 | 23.3 | −3.49 |
| 4 | | −1.291 | (ASP) | 0.070 | | | | |
| 5 | Ape. Stop | Plano | | 0.070 | | | | |
| 6 | Lens 3 | −23.746 | (ASP) | 0.597 | Plastic | 1.544 | 55.9 | 0.92 |
| 7 | | −0.496 | (ASP) | 0.070 | | | | |
| 8 | Lens 4 | −1.027 | (ASP) | 0.300 | Plastic | 1.640 | 23.3 | −0.73 |
| 9 | | 0.959 | (ASP) | 0.092 | | | | |
| 10 | Lens 5 | 3.923 | (ASP) | 0.816 | Plastic | 1.535 | 55.7 | 1.23 |
| 11 | | −0.733 | (ASP) | 0.400 | | | | |
| 12 | IR-cut filter | Plano | | 0.145 | Glass | 1.517 | 64.2 | — |
| 13 | | Plano | | 0.897 | | | | |
| 14 | Image | Plano | | — | | | | |

Note:
Reference wavelength (d-line) is 587.6 nm.

TABLE 16

Aspheric Coefficients

| Surface # | 1 | 2 | 3 | 4 | 6 |
|---|---|---|---|---|---|
| k = | −1.0000E+00 | 1.8424E−01 | 9.8111E+00 | −6.9680E−01 | 3.1787E+01 |
| A4 = | 3.4915E−02 | −4.0644E−01 | −2.1013E−01 | 6.5804E−02 | −2.4036E−01 |
| A6 = | −4.7912E−03 | 3.1875E−01 | 3.6816E−01 | −8.5634E−02 | −2.1100E−01 |
| A8 = | 7.6730E−04 | −5.2354E−01 | 1.6116E−01 | 8.4650E−01 | −5.7750E+00 |
| A10 = | | | −7.1149E−03 | −2.1333E+00 | −5.8911E+01 |
| A12 = | | | 3.7280E−09 | −2.1107E−04 | |

| Surface # | 7 | 8 | 9 | 10 | 11 |
|---|---|---|---|---|---|
| k = | −3.8640E−01 | −9.5152E+00 | −1.5145E+01 | −2.7460E+01 | −1.3324E+00 |
| A4 = | 1.1334E+00 | −2.7021E+00 | −4.2078E−01 | 5.6656E−01 | 2.3276E−01 |
| A6 = | 1.1525E+00 | 1.5143E+01 | 1.6664E+00 | −8.4623E−01 | −2.6967E−01 |
| A8 = | −5.7898E+00 | −5.0361E+01 | −4.2999E+00 | 7.2899E−01 | 1.8345E+00 |
| A10 = | −5.7434E+00 | 8.1509E+01 | 5.2664E+00 | −1.6659E−01 | −2.1500E+00 |
| A12 = | | −7.0292E+01 | −2.6513E+00 | −1.3052E−01 | 7.1410E−01 |

In the wide-angle image capturing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| f (mm) | 0.88 |
|---|---|
| Fno | 2.45 |
| HFOV (deg.) | 82.0 |
| Dr2r3/CT1 | 1.743 |
| Dr4r5/Dr2r3 | 0.268 |
| Dr1r4/Dr5r10 | 0.821 |
| ΣCT/Td | 0.768 |
| TL (mm) | 4.997 |
| \|R6/R7\| | 0.48 |
| (R7 + R8)/(R7 − R8) | 0.03 |
| (R9 + R10)/(R9 − R10) | 0.69 |
| f/f1 | −0.550 |
| \|f/f2\| | 0.253 |
| FOV (deg.) | 164.0 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wide-angle image capturing lens assembly comprising, in order from an object side to an image side:
   a first lens element with negative refractive power having a concave image-side surface;
   a second lens element with refractive power having a concave object-side surface and a convex image-side surface;
   a third lens element having positive refractive power;
   a fourth lens element having negative refractive power, wherein at least one of an object-side surface and an image-side surface of the fourth lens element is aspheric; and
   a fifth lens element with positive refractive power having a convex image-side surface, wherein at least one of an object-side surface and the image-side surface of the fifth lens element is aspheric;
   wherein each of the first through fifth lens elements is a single and non-cemented lens element, an axial distance between the image-side surface of the first lens element and the object-side surface of the second lens element is Dr2r3, a central thickness of the first lens element is CT1, a sum of a central thickness from the first through fifth lens elements is ΣCT, an axial distance between an object-side surface of the first lens element and the image-side surface of the fifth lens element is Td, a focal length of the wide-angle image capturing lens assembly is f, a focal length of the second lens element is f2, an axial distance between the object-side surface of the first lens element and the image-side surface of the second lens element is Dr1r4, an axial distance between an object-side surface of the third lens element and the image-side surface of the fifth lens element is Dr5r10, and the following relationships are satisfied:

$1.0 < Dr2r3/CT1 < 2.5;$ $0.60 < \Sigma CT/Td < 0.81;$ $0 < |f/f2| < 0.30;$ and $0.50 < Dr1r4/Dr5r10 < 1.09.$ 2. The wide-angle image capturing lens assembly of claim 1, wherein the object-side surface of the fourth lens element is concave.

3. The wide-angle image capturing lens assembly of claim 2, wherein the third lens element has a convex image-side surface.

4. The wide-angle image capturing lens assembly of claim 3, wherein an axial distance between the object-side surface of the first lens element and an image plane is TL, and the following relationship is satisfied:

$3.5\ mm < TL < 9.5\ mm.$

5. The wide-angle image capturing lens assembly of claim 4, wherein the fourth lens element has a concave image-side surface, and the image-side surface of the fourth lens element changes from concave at a paraxial region thereof to convex at a peripheral region thereof.

6. The wide-angle image capturing lens assembly of claim 4, wherein a curvature radius of the image-side surface of the third lens element is R6, a curvature radius of the object-side surface of the fourth lens element is R7, and the following relationship is satisfied:

$|R6/R7| < 0.90.$

7. The wide-angle image capturing lens assembly of claim 6, wherein a maximal field of view of the wide-angle image capturing lens assembly is FOV, and the following relationship is satisfied:

$130\ degrees < FOV < 200\ degrees.$

8. The wide-angle image capturing lens assembly of claim 6, wherein the third lens element has a convex object-side surface.

9. The wide-angle image capturing lens assembly of claim 1, wherein the axial distance between the image-side surface of the first lens element and the object-side surface of the second lens element is Dr2r3, the central thickness of the first lens element is CT1, and the following relationship is satisfied:

$1.5 < Dr2r3/CT1 < 2.35.$

10. The wide-angle image capturing lens assembly of claim 9, wherein the image-side surface of the fifth lens element is inclined toward the image side of the wide-angle image capturing lens assembly at an end of a peripheral region of the image-side surface of the fifth lens element which within a location of a maximum effective radius thereof.

11. The wide-angle image capturing lens assembly of claim 9, wherein the focal length of the wide-angle image capturing lens assembly is f, a focal length of the first lens element is f1, and the following relationship is satisfied:

$-0.80 < f/f1 < -0.40.$

12. The wide-angle image capturing lens assembly of claim 11, wherein a curvature radius of the object-side surface of the fourth lens element is R7, a curvature radius of the image-side surface of the fourth lens element is R8, and the following relationship is satisfied:

$-0.8 < (R7+R8)/(R7-R8) < 0.4.$

13. The wide-angle image capturing lens assembly of claim 11, wherein an axial distance between the image-side surface of the second lens element and the object-side surface of the third lens element is Dr4r5, the axial distance between the image-side surface of the first lens element and the object-side surface of the second lens element is Dr2r3, and the following relationship is satisfied:

$0.15 < Dr4r5/Dr2r3 < 0.75.$

14. The wide-angle image capturing lens assembly of claim 9, further comprising:
a stop located between the second lens element and the third lens element.

15. The wide-angle image capturing lens assembly of claim 14, wherein a curvature radius of the object-side surface of the fifth lens element is R9, a curvature radius of the image-side surface of the fifth lens element is R10, and the following relationship is satisfied:

$$0.50<(R9+R10)/(R9-R10)<2.60.$$

16. A wide-angle image capturing lens assembly comprising, in order from an object side to an image side:
a first lens element with negative refractive power having a concave image-side surface;
a second lens element with refractive power having a concave object-side surface and a convex image-side surface;
a third lens element having positive refractive power;
a fourth lens element with negative refractive power having a concave image-side surface, wherein the image-side surface of the fourth lens element changes from concave at a paraxial region to convex at a peripheral region, and at least one of an object-side surface and the image-side surface of the fourth lens element is aspheric; and
a fifth lens element with positive refractive power having a convex image-side surface, wherein at least one of an object-side surface and the image-side surface of the fifth lens element is aspheric;
wherein an axial distance between the image-side surface of the first lens element and the object-side surface of the second lens element is Dr2r3, a central thickness of the first lens element is CT1, a sum of a central thickness from the first through fifth lens elements is ΣCT, an axial distance between an object-side surface of the first lens element and the image-side surface of the fifth lens element is Td, a focal length of the wide-angle image capturing lens assembly is f, a focal length of the second lens element is f2, and the following relationships are satisfied:

$$1.0<Dr2r3/CT1<2.5;$$

$$0.55<\Sigma CT/Td<0.85; \text{ and}$$

$$0<|f/f2|<0.30.$$

17. The wide-angle image capturing lens assembly of claim 16, wherein a curvature radius of an image-side surface of the third lens element is R6, a curvature radius of an object-side surface of the fourth lens element is R7, and the following relationship is satisfied:

$$|R6/R7|<0.90.$$

18. The wide-angle image capturing lens assembly of claim 17, wherein the focal length of the wide-angle image capturing lens assembly is f, a focal length of the first lens element is f1, and the following relationship is satisfied:

$$-0.80<f/f1<-0.40.$$

19. The wide-angle image capturing lens assembly of claim 17, wherein the curvature radius of the object-side surface of the fourth lens element is R7, a curvature radius of the image-side surface of the fourth lens element is R8, and the following relationship is satisfied:

$$-0.8<(R7+R8)/(R7-R8)<0.4.$$

20. The wide-angle image capturing lens assembly of claim 16, further comprising:
a stop located between the second lens element and the third lens element.

21. The wide-angle image capturing lens assembly of claim 20, wherein a maximal field of view of the wide-angle image capturing lens assembly is FOV, and the following relationship is satisfied:

$$130 \text{ degrees}<FOV<200 \text{ degrees}.$$

22. The wide-angle image capturing lens assembly of claim 16, wherein the sum of a central thickness from the first through fifth lens elements is ΣCT, the axial distance between the object-side surface of the first lens element and the image-side surface of the fifth lens element is Td, and the following relationship is satisfied:

$$0.70<\Sigma CT/Td<0.80.$$

23. The wide-angle image capturing lens assembly of claim 16, wherein an axial distance between the object-side surface of the first lens element and an image plane is TL, and the following relationship is satisfied:

$$4.0 \text{ mm}<TL<8.0 \text{ mm}.$$

* * * * *